United States Patent
Singh

(10) Patent No.: US 12,236,921 B2
(45) Date of Patent: Feb. 25, 2025

(54) SYSTEM AND METHOD FOR PRIORITIZING AR INFORMATION BASED ON PERSISTENCE OF REAL-LIFE OBJECTS IN THE USER'S VIEW

(71) Applicant: InterDigital VC Holdings, Inc., Wilmington, DE (US)

(72) Inventor: Mona Singh, Cary, NC (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 55 days.

(21) Appl. No.: 17/679,705

(22) Filed: Feb. 24, 2022

(65) Prior Publication Data

US 2022/0180842 A1 Jun. 9, 2022

Related U.S. Application Data

(63) Continuation of application No. 16/614,293, filed as application No. PCT/US2018/032121 on May 10, 2018, now Pat. No. 11,276,375.

(Continued)

(51) Int. Cl.
*G06T 11/00* (2006.01)
*G09G 5/37* (2006.01)

(52) U.S. Cl.
CPC ............. *G09G 5/37* (2013.01); *G06T 11/00* (2013.01)

(58) Field of Classification Search
CPC .................................. G09G 5/37; G06T 11/00
See application file for complete search history.

(56) References Cited

U.S. PATENT DOCUMENTS 9,349,218 B2 5/2016 Keating
9,589,372 B1 * 3/2017 Bean ................. G06V 20/46
(Continued)

FOREIGN PATENT DOCUMENTS

CN 102999160 A 3/2013
CN 105242275 A 1/2016
(Continued)

OTHER PUBLICATIONS

Y. Huang and I. Essa, "Tracking multiple objects through occlusions," 2005 IEEE Computer Society Conference on Computer Vision and Pattern Recognition (CVPR'05), San Diego, CA, USA, 2005, pp. 1051-1058 vol. 2, doi: 10.1109/CVPR.2005.350. (Year: 2005).*

(Continued)

*Primary Examiner* — Yu Chen
(74) *Attorney, Agent, or Firm* — Klintworth & Rozenblat IP LLP

(57) ABSTRACT

Systems and methods described herein in accordance with some embodiments may display augmented reality (AR) information related to an object based on a predicted persistence of the object within view of the user. In some embodiments, display of AR information is prioritized based upon a prediction of how soon an object will disappear from view, perhaps if the predicted disappearance will occur sooner than some threshold time. Systems and methods described herein in accordance with some embodiments extend to mixed reality (MR) systems, and provide for displaying an image of an object that has become obstructed or has disappeared from view and/or for displaying AR information related to an object that has become obstructed or has disappeared from view.

21 Claims, 24 Drawing Sheets

Related U.S. Application Data

(60) Provisional application No. 62/510,099, filed on May 23, 2017.

(56) References Cited

U.S. PATENT DOCUMENTS

| | | | |
|---|---|---|---|
| 10,434,935 | B1 | 10/2019 | Zhang |
| 10,503,996 | B2* | 12/2019 | Novak ............... G06V 10/768 |
| 2012/0113140 | A1* | 5/2012 | Hilliges ............... A63F 13/213 |
| | | | 345/633 |
| 2012/0124509 | A1 | 5/2012 | Matsuda |
| 2012/0206452 | A1* | 8/2012 | Geisner ............... G06F 3/013 |
| | | | 345/419 |
| 2012/0218416 | A1 | 8/2012 | Leny |
| 2012/0229909 | A1 | 9/2012 | Clavin |
| 2013/0027572 | A1 | 1/2013 | Petrou |
| 2014/0132629 | A1* | 5/2014 | Pandey ............... G06T 11/001 |
| | | | 345/633 |
| 2014/0168262 | A1* | 6/2014 | Forutanpour ......... G06T 19/006 |
| | | | 345/633 |
| 2014/0267400 | A1 | 9/2014 | Mabbutt |
| 2014/0267409 | A1 | 9/2014 | Fein |
| 2014/0282144 | A1* | 9/2014 | Maciocci ............. H04N 13/344 |
| | | | 715/765 |
| 2015/0006278 | A1 | 1/2015 | Di Censo |
| 2015/0206353 | A1* | 7/2015 | Grasso ............... G06T 19/006 |
| | | | 345/633 |
| 2015/0338652 | A1 | 11/2015 | Lim |
| 2016/0026242 | A1 | 1/2016 | Burns |
| 2016/0055676 | A1 | 2/2016 | Kasahara |
| 2016/0210784 | A1* | 7/2016 | Ramsby ............... G02B 27/017 |
| 2016/0260255 | A1 | 9/2016 | Bean |
| 2016/0296840 | A1 | 10/2016 | Kaewell |
| 2016/0307374 | A1 | 10/2016 | Kurz |
| 2016/0364916 | A1 | 12/2016 | Terahata |
| 2016/0366342 | A1 | 12/2016 | Vonolfen |
| 2017/0061696 | A1* | 3/2017 | Li ..................... G02B 27/017 |
| 2017/0069143 | A1 | 3/2017 | Salter |
| 2017/0322623 | A1* | 11/2017 | McKenzie .......... G06F 3/04886 |
| 2018/0089899 | A1* | 3/2018 | Piemonte ............. G06T 15/506 |
| 2018/0157321 | A1* | 6/2018 | Liu ..................... G06V 40/16 |
| 2019/0114810 | A1 | 4/2019 | Tokuchi |
| 2019/0347862 | A1* | 11/2019 | Singh ................... G06F 3/011 |

FOREIGN PATENT DOCUMENTS

| | | |
|---|---|---|
| CN | 105324738 A | 2/2016 |
| EP | 2458486 A1 | 5/2012 |
| EP | 2950181 A1 | 12/2015 |
| EP | 2983138 A1 | 2/2016 |
| WO | 2014209770 A1 | 12/2014 |

OTHER PUBLICATIONS

Mertz, Christoph, et. al., "Moving Object Detection with Laser Scanners". Journal of Field Robotics, vol. 30, No. 1, (2013), pp. 17-43.

Katz, Sagi, et. al., "Direct Visibility of Point Sets". ACM Transactions on Graphics vol. 26, No. 3, Aug. 2007, 11 pages.

Katz, Sagi, et. al., "On the Visibility of Point Clouds". Proceedings of the IEEE International Conference on Computer Vision, (2015), 9 pages.

Höllerer, Tobias, et. al., "User Interface Management Techniques for Collaborative Mobile Augmented Reality". Computers and Graphics, vol. 25, No. 5, Elsevier Science Ltd, Oct. 2001, pp. 799-810.

Li, Liyuan, et. al., "Foreground Object Detection from Videos Containing Complex Background". Proceedings of the ACM International Conference on Multimedia, Nov. 2-8, 2003, pp. 2-10.

Piccardi, Massimo, "Background Subtraction Techniques: A Review". IEEE International Conference on Systems, Man and Cybernetics, (2004), pp. 3099-3104.

Heikkilä, Marko, et. al., "A Texture-Based Method for Modeling the Background and Detecting Moving Objects". IEEE Transactions on Pattern Analysis and Machine Intelligence, vol. 28, No. 4, Apr. 2006, pp. 657-662.

Invitation to Pay Additional Fees and, where applicable, protest fee for PCT/US2018/032121 mailed Aug. 21, 2018.

International Search Report and Written Opinion of the International Searching Authority for PCT/US2018/032121 mailed Oct. 16, 2018.

International Preliminary Report on Patentability for PCT/US2018/032121 mailed Nov. 26, 2019, 16 pages.

Jäkel, T. et al., "Position paper: Runtime model for role-based software systems." In 2016 IEEE International Conference on Autonomic Computing (ICAC), pp. 380-387. IEEE, 2016 (8 pages).

Changsheng, L. "Modeling Terrestrial Ecosystems" Complex Systems and Complexity Science vol. 1 No. 1, Jan. 2004 (27 pages).

Xiukun, L. et al., "Design and Implementation of Outdoor Augmented Reality System Based on AR Toolkit" Surveying and Mapping Science vol. 34, Oct. 2009.

\* cited by examiner

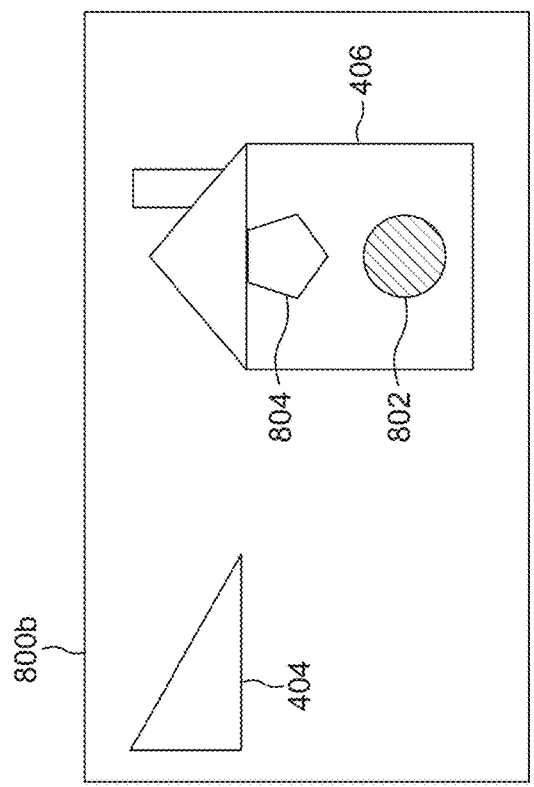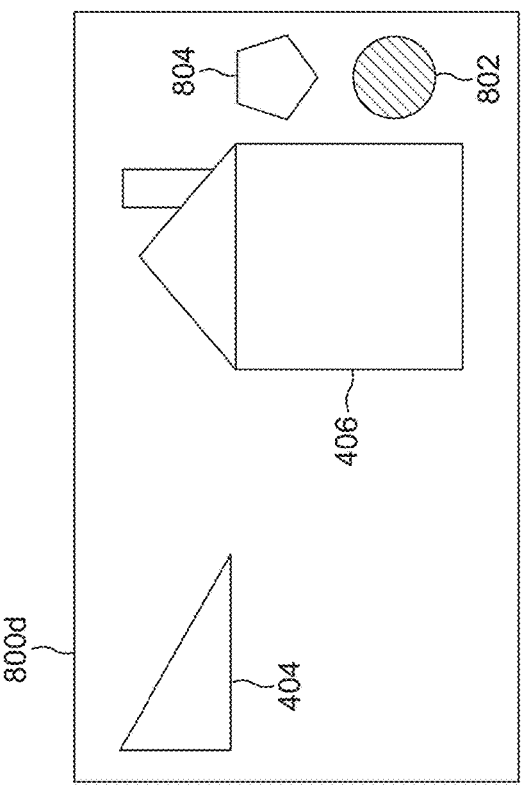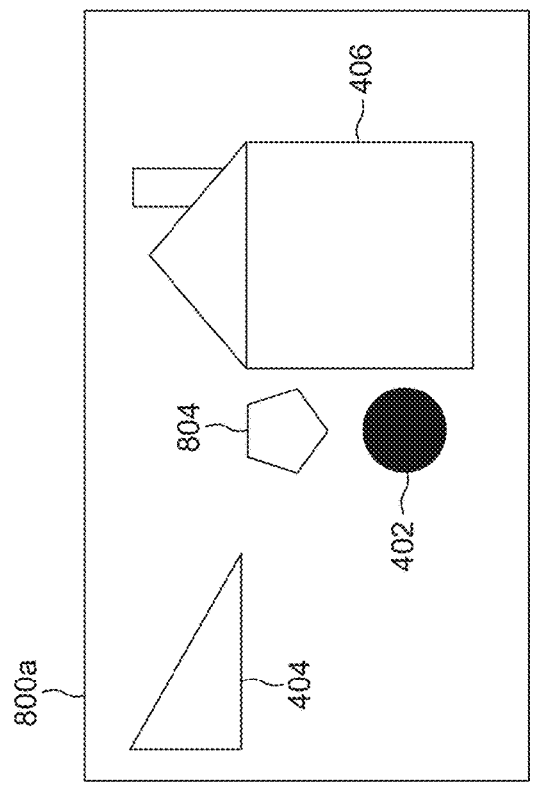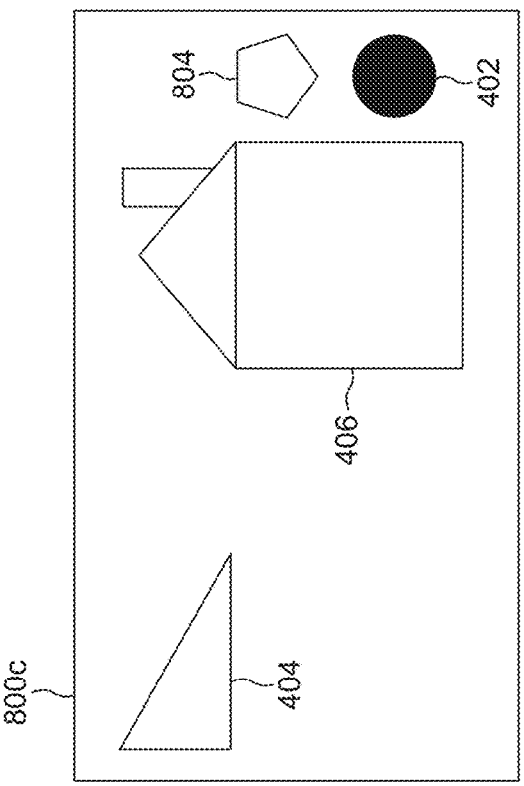

SYSTEM AND METHOD FOR PRIORITIZING AR INFORMATION BASED ON PERSISTENCE OF REAL-LIFE OBJECTS IN THE USER'S VIEW

CROSS-REFERENCE TO RELATED APPLICATIONS

The present application is a continuation of U.S. patent application Ser. No. 16/614,293, filed Nov. 15, 2019, entitled "SYSTEM AND METHOD FOR PRIORITIZING AR INFORMATION BASED ON PERSISTENCE OF REAL-LIFE OBJECTS IN THE USER'S VIEW," which claims benefit under 35 U.S.C. § 371 of International Application No. PCT/US2018/032121, filed May 10, 2018, entitled "SYSTEM AND METHOD FOR PRIORITIZING AR INFORMATION BASED ON PERSISTENCE OF REAL-LIFE OBJECTS IN THE USER'S VIEW," which claims benefit under 35 U.S.C. § 119 (e) from U.S. Provisional Patent Application Ser. No. 62/510,099, filed May 23, 2017, entitled "System and Method for Prioritizing AR Information Based on Persistence of Real-Life Objects in the User's View," each of which is incorporated herein by reference in its entirety.

BACKGROUND

Augmented reality (AR) interfaces present information to a user relating to some real-life (real-world) object that is present within the user's view. Mixed reality (MR) interfaces present information to a user in a way that combines virtual objects with a view of the real world. With MR displays, some of the objects are real, while some are virtual; additionally, some AR information about the real and/or virtual objects may also be displayed.

SUMMARY

Systems and methods described herein in accordance with some embodiments may display augmented reality (AR) information related to an object based on a predicted persistence of the object within view of the user. In some embodiments, display of AR information is prioritized based upon a prediction of how soon an object will disappear from view, perhaps if the predicted disappearance will occur sooner than some threshold time. Systems and methods described herein in accordance with some embodiments extend to mixed reality (MR) systems, and provide for displaying an image of an object that has become obstructed or has disappeared from view and/or for displaying AR information related to an object that has become obstructed or has disappeared from view.

In some embodiments, a method of prioritizing AR information based on object persistence within a user's view may include: receiving scene information; receiving a plurality of AR pairs, each AR pair comprising an identification of an objects and AR information associated with the identified object; determining persistence for objects in the plurality of AR pairs; prioritizing display of AR information for objects based on the determined persistence values for the corresponding objects; and sending information augmented with prioritize AR information to a display.

In some embodiments, determining persistence values may include determining how long each object may persist within a user's view, or determining an object's velocity and an object's visibility. Determining an object's velocity may include performing motion tracking of the object. Determining persistence values may include determining how long an object will persist in a user's view based on the object's coordinates, the object's velocity, and boundaries of the received scene information. In some embodiments, determining persistence values may use a straight line of motion model, or using historical motion to predict future motion. Persistence values may be determined up to threshold prediction time limit, which in some embodiments may be 30 seconds. In some embodiments, determining persistence values may include predicting points in a line of motion of an object and/or displaying the predicted points in the line of motion of the object. Visibility may be determined for the predicted points in the line of motion of the object, as part of determining persistence values. In some embodiments, determining persistence values may include determining occlusion of an object. In some embodiments, determining persistence for objects in the plurality of AR pairs may include sending the plurality of AR pairs to a persistence determiner; and receiving the determined persistence for objects in the plurality of AR pairs.

In some embodiments, prioritizing display of AR information may include presenting AR information first for objects having a predicted persistence shorter than a first threshold. In some embodiments, prioritizing display of AR information may include presenting AR information first for objects having a predicted persistence shorter than a first threshold but longer than a second threshold. Prioritizing display of AR information may include determining whether AR information for an object has been displayed; and responsive to determining that AR information for the object has been displayed, not displaying the AR information for the object again. Prioritizing display of AR information may include assigning a prioritization score to an AR pair; and displaying AR information corresponding to pairs having higher prioritization scores prior to displaying AR information corresponding to pairs having lower prioritization scores. Prioritizing display of AR information may include highlighting a display of the AR information with a different font size or color than AR information that is not prioritized. Some embodiments of the method may further include: responsive to receiving the scene information, sending the scene information to an information service, and wherein receiving a plurality of AR pairs includes receiving the plurality of AR pairs from the information service. Receiving scene information may include sensing scene information with a scene sensor. And in some embodiments, scene information may include a point cloud.

In some embodiments, a method of prioritizing AR information based on object persistence within a user's view may include tracking motion of a plurality of real-world objects; based on the tracking of the objects, predicting how long each object is likely to persist in the user's field of view; and prioritizing display of the AR information for those objects having shorter predicted persistence, wherein prioritizing display of the AR information comprises displaying first.

In some embodiments, a system may include a processor; and a non-transitory computer-readable medium storing instructions that are operative, when executed by the processor, to perform the methods disclosed herein. A system my further include a display and a scene sensor.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIGS. 8A-8D are illustrations of MR user views for actual and virtual objects under various conditions, as may be observed with some embodiments.

The entities, connections, arrangements, and the like that are depicted in, and in connection with, the various figures are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity of presentation, this implied leading clause is not repeated ad nauseum in the detailed description of the drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Example Networks for Implementation of the Embodiments

Figure 1A:
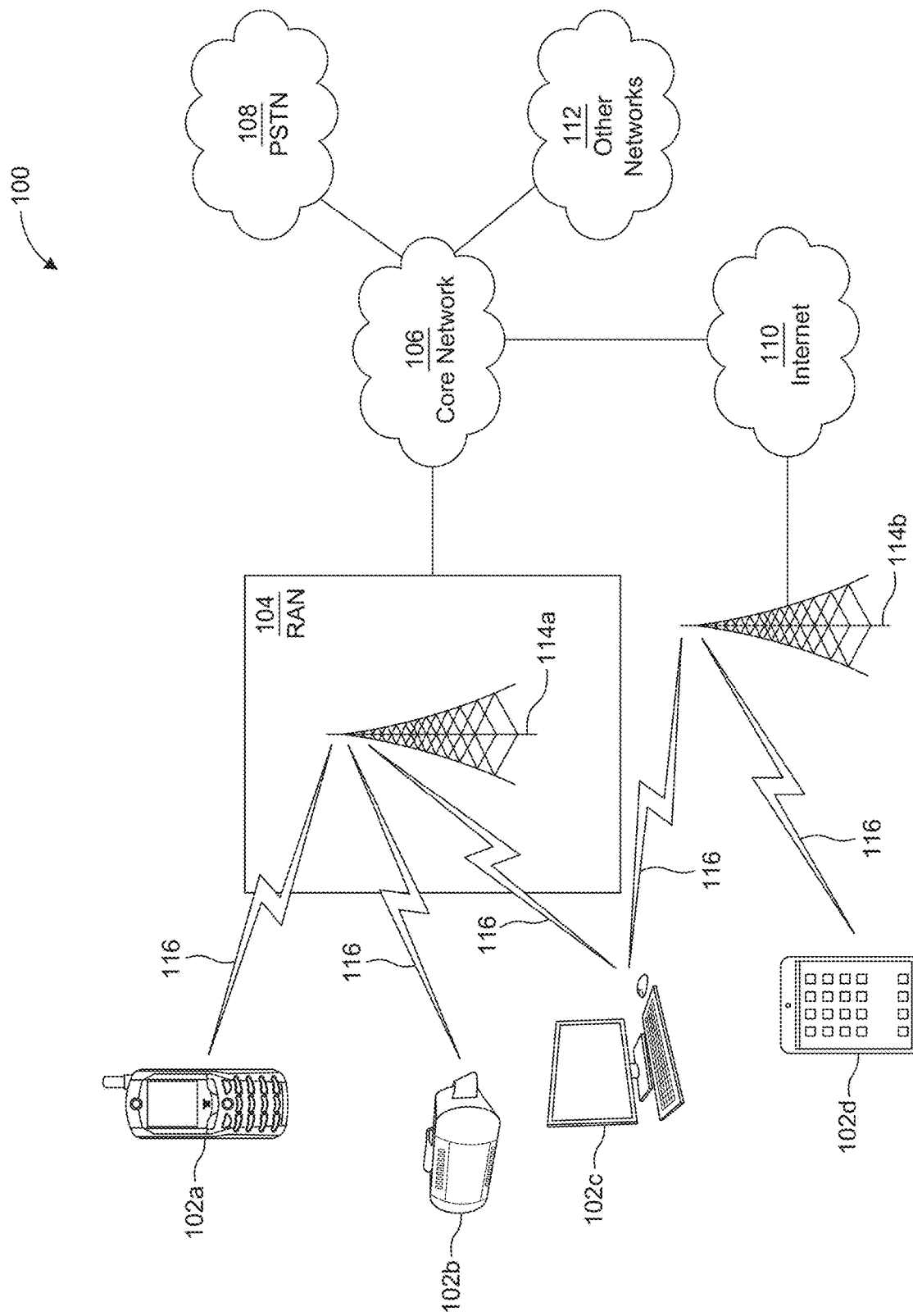
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. By way of example, the client device 102a is depicted as a cellular telephone; the client device 102b is depicted as an HMD for 3D augmented reality (AR), virtual reality (VR) and/or mixed reality (MR) display; client device 102c is depicted as a desktop compute; and the client device 102d is depicted as a tablet computer. Any of WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro). In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
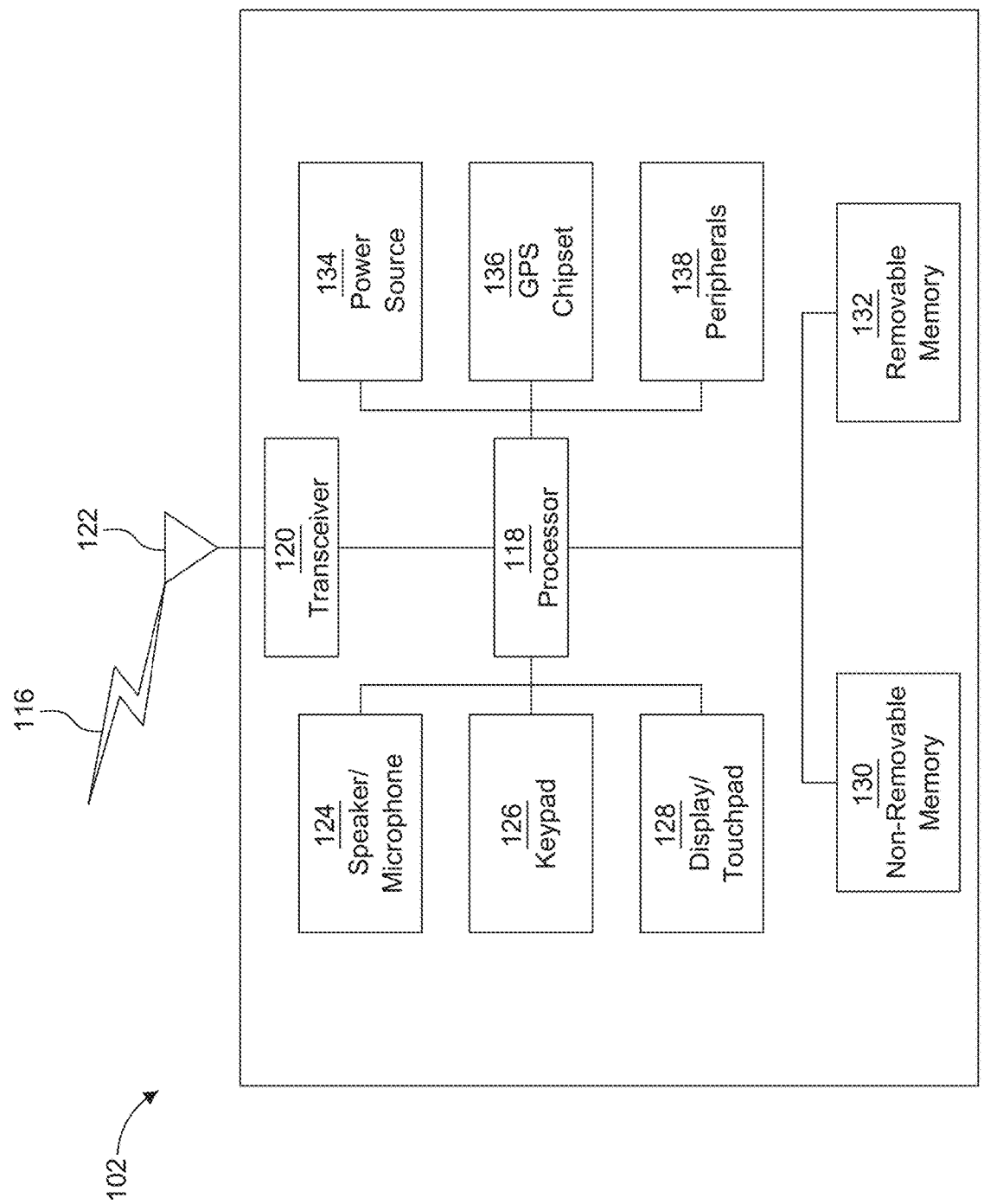
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, an Augmented Reality, Virtual Reality, and/or Mixed Reality (AR/VR/MR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
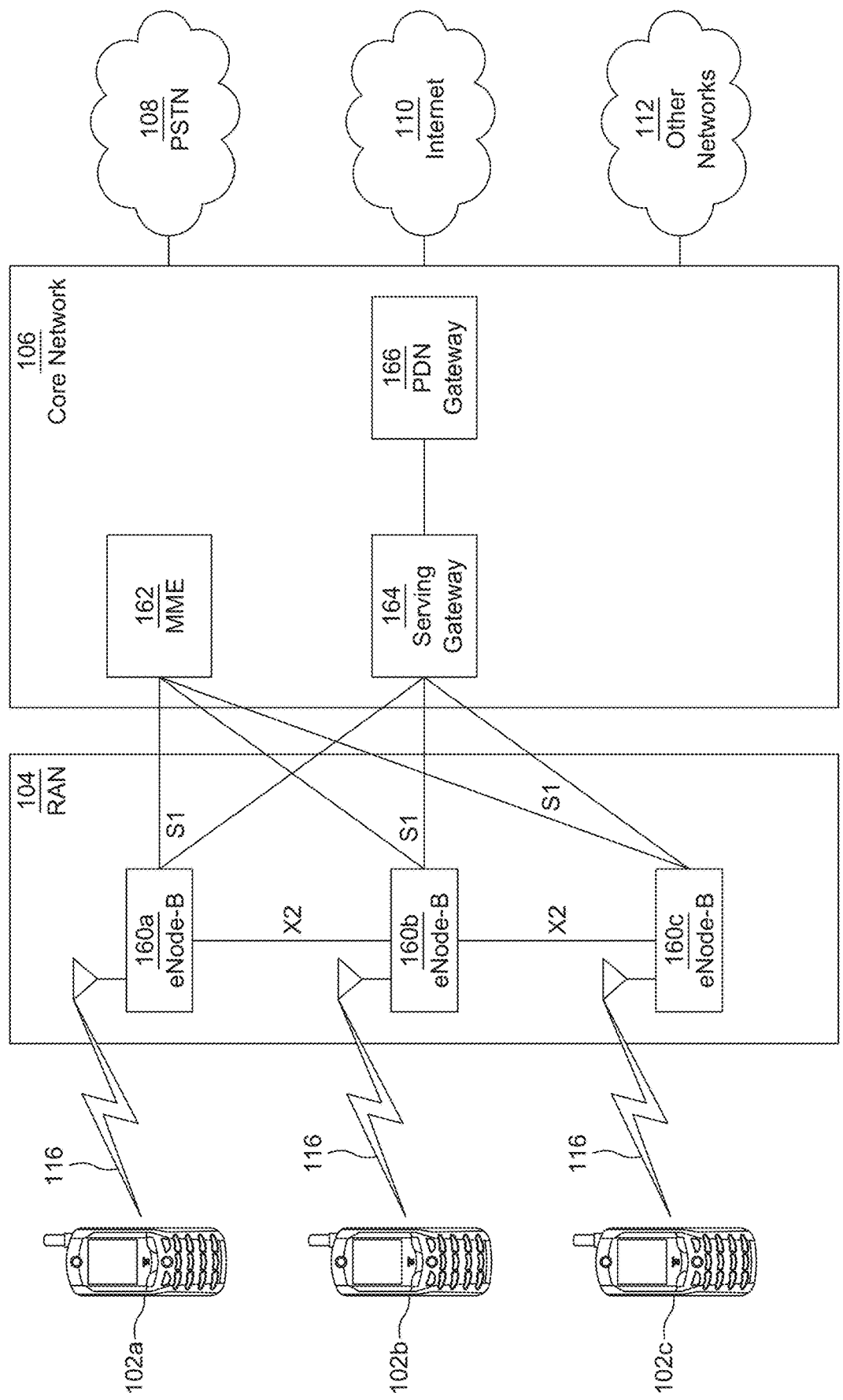
FIG. 1C is a system diagram illustrating an example radio access network (RAN) and an example core network (CN) that may be used within the communications system illustrated in FIG. 1A according to some embodiments.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
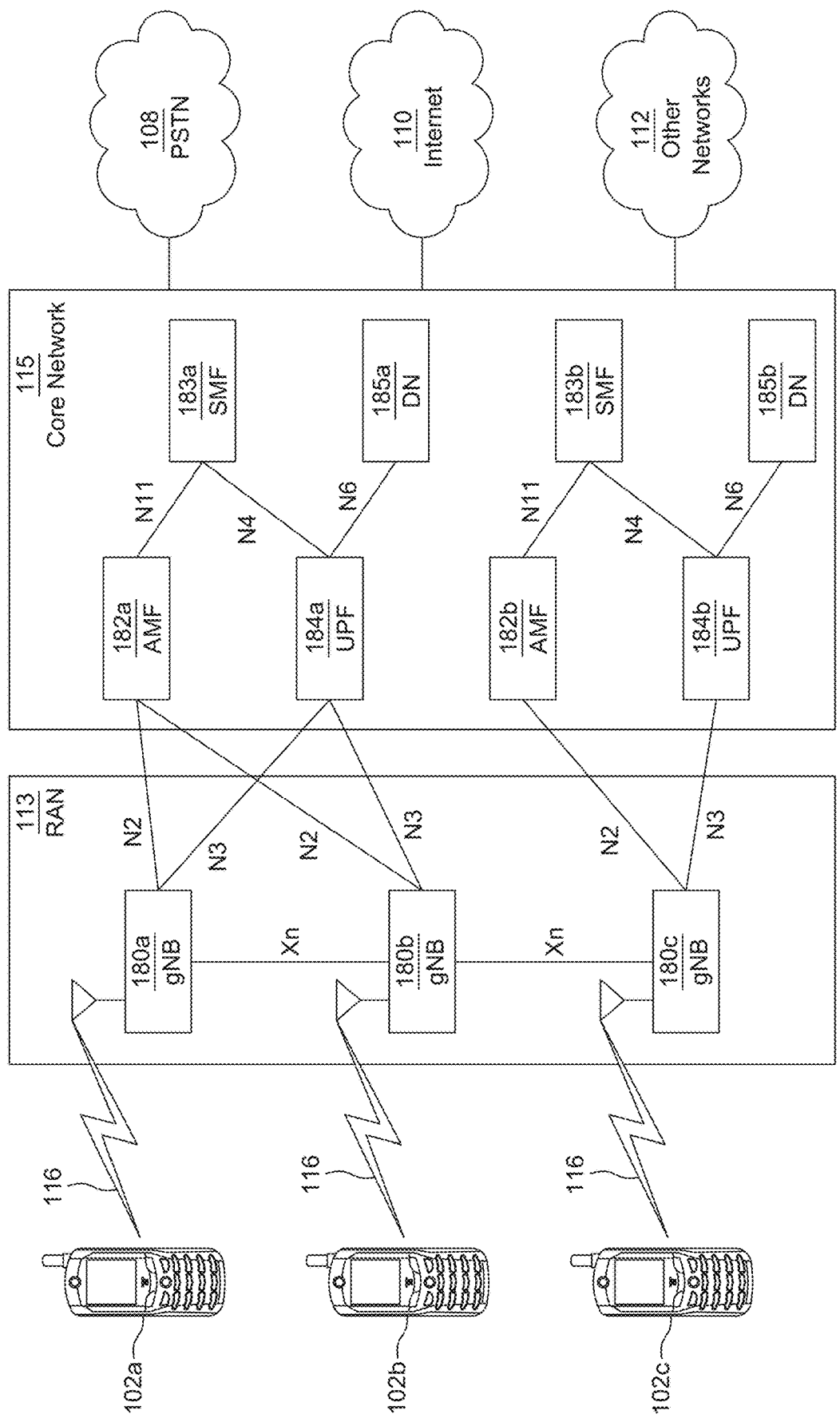
FIG. 1D is a system diagram illustrating a further example RAN and a further example CN that may be used within the communications system illustrated in FIG. 1A according to some embodiments.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

Figure 1E:
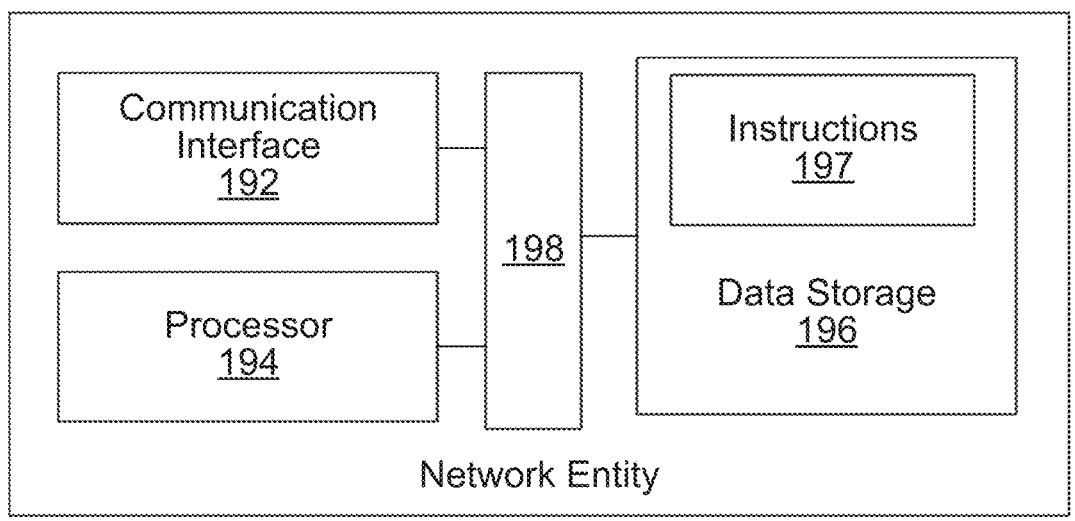
FIG. 1E illustrates a network entity that can perform methods disclosed herein, according to some embodiments.

FIG. 1E depicts an exemplary network entity 190 that may be used in embodiments of the present disclosure, for example as an AR or MR manager or as a UE. As depicted in FIG. 1E, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor, a graphics processing unit (GPU) and a dedicated digital signal processor (DSP). Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1E, data storage 196 is a non-transitory computer-readable media that contains program instructions 197 executable by processor 194 for carrying out various combinations of the various network-entity functions described herein. Processor 194 is configured to execute instructions 197 stored in memory 196.

In view of FIGS. 1A-1E, and the corresponding description of FIGS. 1A-1E, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions. By way of example, the client device 102a is depicted as a cellular telephone; the client device 102b is depicted as an HMD for 3D AR, VR and/or MR display; client device 102c is depicted as a desktop compute; and the client device 102d is depicted as a tablet computer. It should be understood that any of these devices, or other devices having similar functionality, may be suitable for either the client side device or the server side device.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Presentation of AR and MR Information

Systems and methods described herein in accordance with some embodiments may display augmented reality (AR) information related to an object based on a predicted persistence of the object within view of the user. In some embodiments, display of AR information is prioritized based upon a prediction of how soon an object will disappear from view, perhaps if the predicted disappearance will occur sooner than some threshold time. Systems and methods described herein in accordance with some embodiments extend to mixed reality (MR) systems, and provide for displaying an image of an object that has become obstructed or has disappeared from view and/or for displaying AR information related to an object that has become obstructed or has disappeared from view.

AR interfaces present information to a user relating to some real-life (real-world) object that is present within the user's view. Such systems may have challenges with ordering or prioritizing presentation of AR information, and may risk overloading a user or not presenting the information that is most acutely needed. MR interfaces present information to a user in a way that combines virtual objects with a view of the real world. With MR displays, some of the objects are real, while some are virtual; additionally, some AR information about the real and/or virtual objects may also be displayed. MR systems may present similar challenges regarding ordering or prioritizing presentation of AR information, and may thus likewise may present a risk of overloading a user or not presenting the information that is most acutely needed. Further, both AR and MR systems may also have challenges presenting AR information for an object when there has been an interruption of a user's interaction with or view of the object.

Certain systems may have challenges with presenting AR information for real-world objects to a user in a manner that maximizes the user's opportunity to benefit from available AR information. For example, these systems may have challenges when there is relative motion between the user and the object that results in the real-world object disappearing from view. Certain AR systems do not account for how long an object will likely to remain visible to a user. Thus, the user may be viewing AR information for an object that will persist in the user's view, even as another object is soon to disappear. Thus, the user may miss an opportunity to receive AR information about the object that does not persist in view.

In some embodiments of systems and methods described herein, AR information for real-world objects is presented such that real-world objects that are determined to be most likely to disappear soonest may be presented first, or presented with emphasis, such as highlighting. That is, AR information for objects likely to disappear from view may be presented prior to presenting AR information for other objects that are likely to remain in view, AR information both types of objects may be presented simultaneously with highlighting for objects likely to disappear. In some embodiments, there may be a combination.

Systems and methods disclosed herein in accordance with some embodiments may prioritize AR information based on the persistence of an object within the user's view. For some embodiments, methods may include receiving a plurality of one or more AR pairs, e.g., a list of one or more AR pairs, where each AR pair comprises a real-world object and associated AR information; determining the persistence of objects; and presenting AR information based on the persistence of objects in the user's view, such that AR information is prioritized for objects with a persistence shorter than a threshold. As used herein, in accordance with some embodiments, a pair is a real-world (real-life) object (or description of a location of a real-world object) and associated AR information. A pair may be displayed in more than one scene. A user may or may not have interacted with a pair. As used herein, in accordance with some embodiments, a view is what a user sees through, e.g., an MR display, which may include real-world objects, virtual objects, and AR information. A view may extend beyond a user's environment, for example, if the user is viewing an outdoor space extending to a distant horizon, rather than the user merely viewing nearby objects within a window-less room. As used herein, in accordance with some embodiments, persistence is a period of time for defining how long a real-world object remains within a user's view. For some embodiments, prioritizing AR information based on persistence may be as simple as displaying AR information for highest priority AR pairs first, with AR information for lower priority pairs being displayed at a later time. For some embodiments, prioritizing AR information based on persistence may include highlighting the objects, such as with an outline, or highlighting the AR information, such as with a different font size, font color, framing, and/or background color. Thus, the user's attention may be drawn to objects of short persistence, to enable the user to benefit from AR information.

For some embodiments, prioritizing AR information based on persistence may include presenting AR information first for objects having a predicted persistence shorter than a first threshold but longer than a second threshold. The second threshold may prevent wasting a user's attention for objects that departed the user's view too quickly. This enables a user to see AR information for objects that will disappear soon, but yet remain in view for a sufficient length of time to exceed the second threshold.

Systems and methods disclosed herein in accordance with some embodiments may focus on ongoing interactions that are at a risk of being interrupted and have been interrupted, in order to provide continuity for those interactions. For example, an object may be of sufficient value or interest to the user for the user to begin to interact with it. However, the object may disappear from a user's view, due to the movement of that object or occlusion. In such a scenario, the user may not have completed the planned interaction with the object and its associated AR information.

Systems and methods disclosed herein in accordance with some embodiments may detect that a relevant real-world object has moved out or will move out of a user's view, determine that a user interaction has been or may be interrupted as a result, and then compose an MR view that includes a virtual representation of that object and associates that virtual representation with AR information about the real-world equivalent of the virtual object. In such embodiments, a user may benefit from AR information about an object even though the object is absent from the user's view. Some embodiments may accomplish this by (1) identifying a real-world object that was present in a user's view but has only just moved out of the view; (2) presenting a virtual object representing that real-world object; and (3) presenting AR information for the real-world object linked to the virtual object representation.

Systems and methods disclosed herein in accordance with some embodiments may present, through an MR interface, AR information associated with a real-world object that is absent from the user's view. For one exemplary embodiment, such methods may comprise receiving a pair that is present in the user's view; determining whether the user's interaction with the received pair has been interrupted by the real-world object becoming absent from the user's view; and composing an MR view to enable the user to continue interacting with the pair by suitably placing an MR representation of the pair into the view. As used herein, in accordance with some embodiments, a present object is a real-world object that is visible or otherwise inferred in a user's view. A present object may include an object that is visually present, even if that object is not directly visible. As used herein, in accordance with some embodiments, a present pair is a present real-world object and its associated AR information item. As used herein, in accordance with some embodiments, an absent object is a real-world object that is not present in a user's view. As used herein, in accordance with some embodiments, an MR representation of a pair is a representation suitable for an MR interface in which the real-world object is represented as a virtual object, and the real-world object's associated AR information is presented by linking to or otherwise augmenting its corresponding virtual object. For some embodiments, an MR representation of a real-world object may be composed only for those objects interacting with a user, where that interaction has been interrupted for longer than a threshold time. For some embodiments, an MR representation of a real-world object may be composed only for those objects interacting with a user, where associated AR information is not displayed to the user recently within a threshold period of time.

Some embodiments may determine whether an object has been occluded or has exited the scene. For occlusion, a virtual object representation may be placed where the occluded object is calculated or otherwise expected to be. Otherwise (such as via exiting the scene or, e.g., having an unpredicted disappearance), if a background object persists, the representation may be placed where the real-world object was seen relative to the background object. If no background object persists, the representation may be placed where the object was last seen relative to the user's view. As a result, in some embodiments, the MR view should place the representation at a location that appears natural to the user. In some embodiments, the MR view may be composed by determining where to place a virtual representation of a real-world object to enable an interaction that seems natural to a user.

Figure 2:
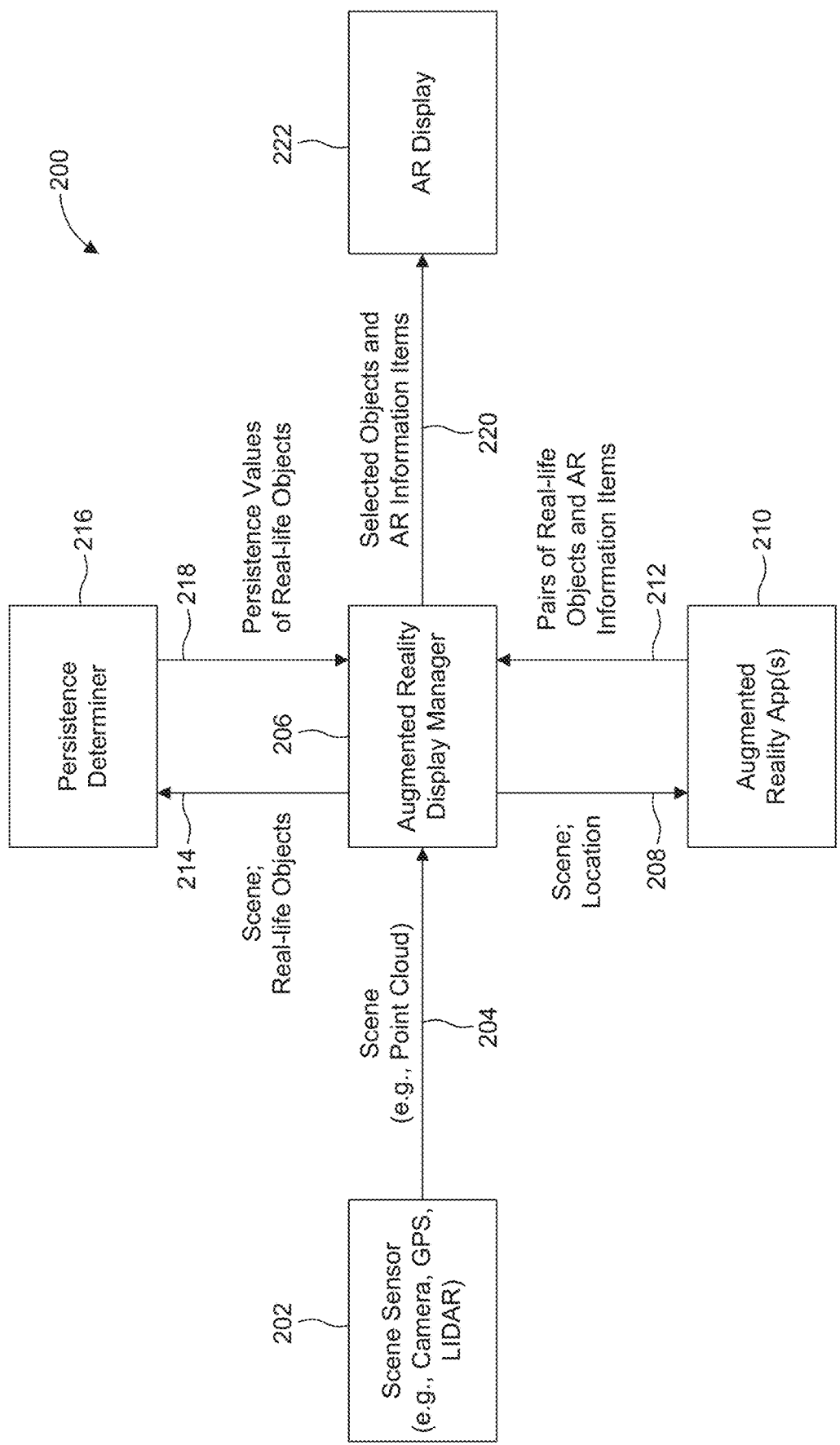
FIG. 2 is a message flow diagram for a method of prioritizing augmented reality (AR) information based on persistence of objects within the user's view, according to some embodiments.

FIG. 2 is a message flow diagram 200 for an example method of prioritizing AR information based on persistence of objects within the user's view, according to some embodiments. As illustrated, one or more scene sensors 202 (for example, a camera, RGB-D sensor, light detection and ranging (Lidar), and/or GPS) provides scene information 204 (e.g., as a point cloud), including possibly location information, to an AR display manager 206. AR display manager 206 receives scene information 204 and sends combined scene and location information 208 to one or more AR applications (AR Apps) 210. Although AR apps are described, it should be understood that MR apps may also be used. AR apps 210 uses the received information 208 to produce a set of pairs 212 of identified real-world objects and corresponding AR data. Each pair, in set of pairs 212 includes information identifying an object (possibly using an identification by location coordinates that includes an image of the object and boundary coordinates) along with associated AR data that provides information about the object and may also describe how to render that information in an AR display. AR Apps 210 then provides set of pairs 212 to AR display manager 206.

According to the example, AR display manager 206 receives set of pairs 212, and sends an identification of the objects 214 to a persistence determiner 216. Persistence determiner 216 computes persistence values for each received object, for example, by determining the amount of motion of each object based on current and previous scenes. Persistence determiner 216 may calculate a prediction of when each object may move out of view of the current scene, which may be based on an assumption that the current scene is a sufficiently accurate prediction of what the user will see next. Persistence determiner 216 may send calculated persistence values 218 back to AR display manager 206. In some embodiments, AR display manager 206 gives greater priority to the presentation of AR information relating to objects whose persistence is calculated to be below a first threshold. In some embodiments, AR display manager 206 gives greater priority to the presentation of AR information relating to objects whose persistence is calculated to be below a first threshold and above a second threshold. AR display manager 206 then sends the selected objects and AR information 220 to an AR display 222 for viewing by a user. The computation of persistence values will be described in more detail with later figures.

In some embodiments, AR display manager 206 operates on an ongoing basis, performing the following actions: receiving scene information 204, sending scene and location information 208 to AR applications 210, receiving object and AR information pairs 212, sending scene and object information 214 to a persistence determiner 216, receiving real-world object persistence values 218, prioritizing AR information display, and sending display information 220 to an AR display 222. Scene information may be received from available sensors. Scene and location information may be sent to appropriate AR applications, such as subscribed AR applications. An AR Display Manager may receive a list of pairs (as described above) from each of multiple AR applications and compile a master list of pairs.

It should be understood that, in some embodiments, AR display manager 206 operates on a server remote from the UE, and in some embodiments, AR display manager 206 is implemented within the UE. In some embodiments, AR display manager 206 and persistence determiner 216 may operate on different nodes, and in some embodiments, AR display manager 206 and persistence determiner 216 may operate within the same nodes. In some embodiments, AR display 222 operates as part of the same UE as one or more scene sensors 202. It should be understood that, in some embodiments, at least some of AR apps 210 may be local and running within the UE. Therefore, although the system illustrated in FIG. 2 is described as a distributed system, in some embodiments, the method may be performed within a single UE.

Figure 3:
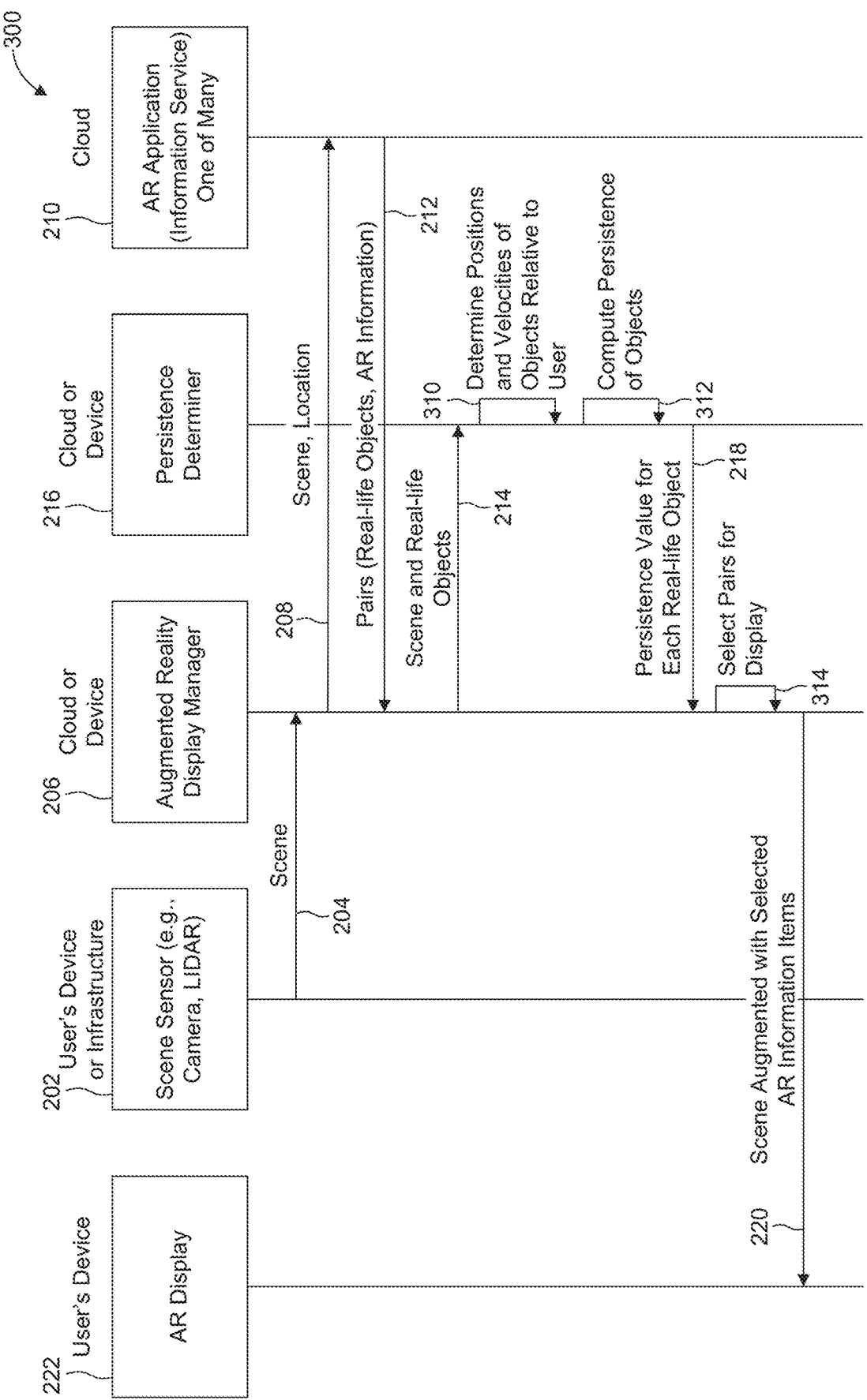
FIG. 3 is a message sequence diagram for a method of prioritizing AR information based on persistence of objects within the user's view, according to some embodiments.

FIG. 3 is a message sequence diagram 300 for an example method of prioritizing AR information based on persistence of objects within the user's view, according to some embodiments. Scene sensor 202, which may be part of a UE or an infrastructure device, sends scene information 204 to AR display manager 206. AR display manager 206 may be a device, such as a server, or a cloud-based module. AR display manager 206 sends scene and location information 208 to an AR application (or information service) 210, which may be one of many AR apps. AR app 210 may be a software module resident in the cloud. AR app 210 may send pairs 212 of objects and AR information to AR display manager 206. AR display manager 206 may send scene and objects 214 to persistence determiner 216. For some embodiments, persistence determiner 216, which may be a software module on a device or cloud-based module, determines 310 positions and velocities of objects relative to a user's view and calculates 312 persistence of objects (and associated persistence values). Persistence determiner 216 may send determined (calculated) persistence values 218 for each object to AR display manager 206. For some embodiments, AR display manager 206 selects 314 which pairs to display based on received persistence values. AR display manager 206 sends scene information augmented with selected or prioritized AR information 220 to AR display 222, which may be part of a UE.

In some embodiments, a method of calculating persistence values includes determining how long each object may persist within a user's view. Representative methods may employ computer vision (machine vision) to determine velocity and visibility, perhaps one method for motion tracking and another method for visibility detection. Example motion tracking methods include, for example, a method described in: Christoph Mertz, et al., *Moving Object Detection with Laser Scanners*, 30(1) J. Field Robotics 17-43 (2013), available at https://www.ri.cmu.edu/pub_files/2013/1/rob21430.pdf. Example visibility determination methods include, for example, a method described in Sagi Katz, et al., *Direct Visibility of Point Sets*, 26:3 ACM Transactions on Graphics (SIGGRAPH) 24:1-24:11 (August 2007), available at http://webee.technion.ac.il/~ayellet/Ps/KatzTalBasri.pdf.

Some embodiments for calculating (determining) persistence values may use velocity and visibility detection of an object to determine how long that object will persist in a user's view based on direction, speed of travel, and the boundaries of the received point cloud. Some embodiments for calculating persistence values of objects computes an object's coordinates and velocity. For example, velocity may be calculated based on a motion tracking method that uses laser rangefinder data (such as Lidar data) as an input, and outputs an object's coordinates and velocity. Sometimes, a straight line of motion may be determined as a set of points corresponding to an object's anticipated motion for a short duration less than a prediction threshold (for assuming constant motion). In such embodiments, historical motion is used to predict future motion, with an assumption that constant motion may be likely to continue for the threshold value of time.

For some embodiments, this threshold may be set to 30 seconds as a default value, to be adjusted upon need, or, e.g., experience indicating that a different threshold may be preferable. In some embodiments, this threshold may be set based on the user's velocity (if determined). A stationary user may observe substantially the same scene for a longer period of time than a user moving in a car on a high-speed roadway. Points in an object's line of motion may be limited to those points corresponding to the object's change in position based on its velocity and the prediction time threshold. Points corresponding to an object's line of motion may be inserted into a scene's point cloud, and thus displayed to the user. A visibility detection method may be used to determine which points will be visible to a user. For some embodiments, the present scene may be used as an estimate of a future scene that the user will view. For some embodiments, determining point visibility may use a method similar to one described by Katz, et al. (referenced above). Some visibility detection methods may compute visible points based on surface reconstruction, although this is not used by all methods. For some embodiments, based on the results of the point visibility method, visibility may be determined for points corresponding to a line of motion. The first point in a line of motion to be determined to be invisible indicates where an object may be occluded by something else in a scene. This point may be identified as a point of disappearance. If no point in a line of motion is determined to be invisible, the object is determined to not leave the scene (or the visible part of the environment) within the prediction threshold time. For some embodiments, based on current position, point of disappearance, and velocity of an object, a persistence value of an object may be calculated.

Thus, the system tracks motion of a plurality of real-world objects, based on the tracking of the objects, predictions are made regarding how long each object is likely to persist in the user's field of view, and the display of the AR information is prioritized for those objects having the shortest predicted persistence, that is longer than some minimum threshold time.

Figure 4A:
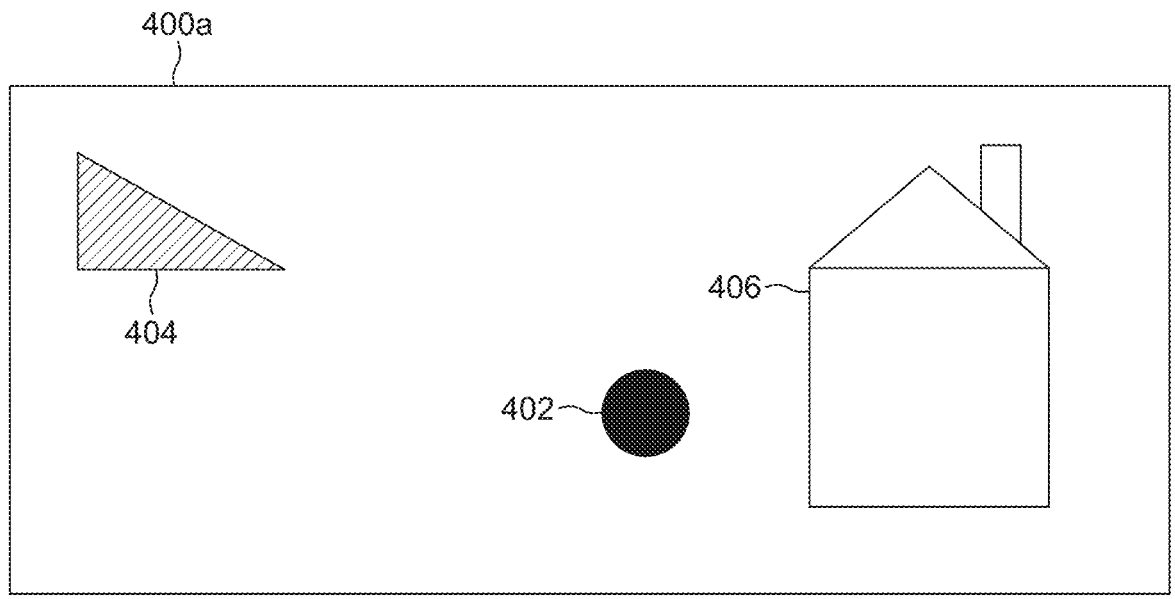
FIGS. 4A-4B are a sequence of user views that show a basis for a persistence determination that may be used in some embodiments.
Figure 4B:
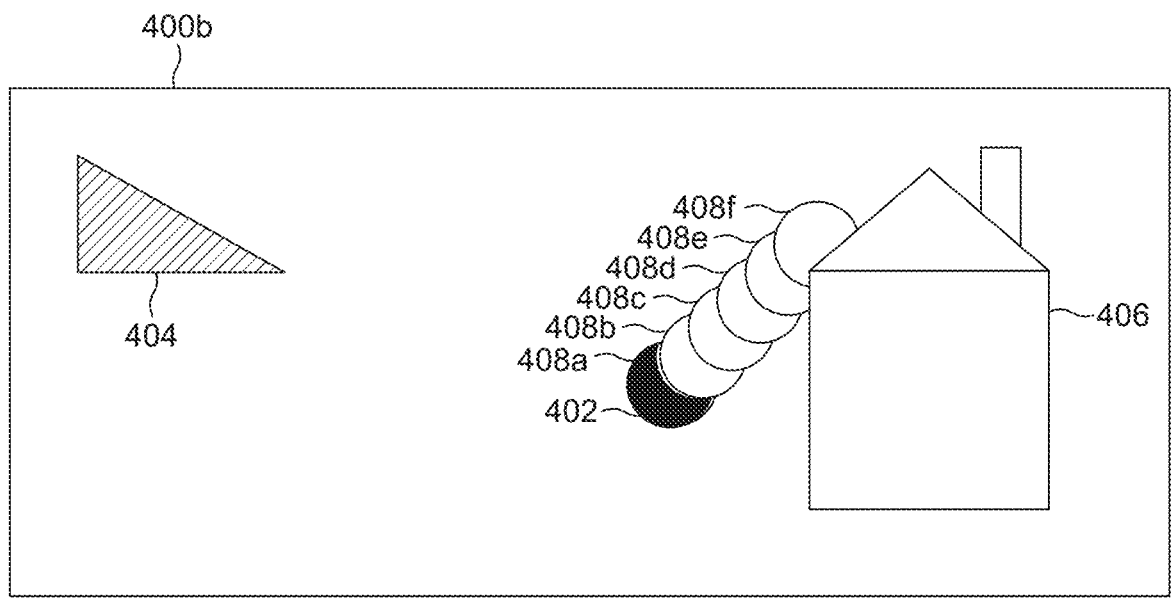

FIGS. 4A-4B are a sequence of user views that show a basis for a persistence determination that may be used in some embodiments. FIG. 4A illustrates a scene 400a at time t=0 that is used as a reference to determine motion of objects. For this example, the user's view includes a circle object 402, a triangle object 404, and a building 406. FIG. 4B is a scene 400b, same view, but at a later time t=T (the current scene). For some embodiments, by comparing scene 400a at time t=0 with scene 400b at time t=T, a motion tracker module may determine coordinates and motion for objects 402, 404, and 406. In this example, circle 402 is moving, while triangle 404 and building 406 remain stationary. In FIG. 4B, circle object 402 is at a new position 408a, and predicted positions 408b-408f are also illustrated. Position 408f may be the final predicted position within the prediction threshold time. In some embodiments, ghost images may be inserted at predicted positions 408b-408f, where circle object 402 is calculated to be moving (if the motion of circle object 402 is constant and the remainder of scene 400b remains unchanged). Some of the ghost images may be occluded by building 406, and some embodiments may use this information to determine a persistence prediction for circle object 402.

Some embodiments may use information regarding motion and predicted persistence of circle 402 to prioritize showing AR information about circle object 402 over showing AR information about triangle 404. Some embodiments may deprioritize showing AR information about circle object 402 if it has already been displayed to the user. Some embodiments may deprioritize showing AR information about circle object 402 if it will become occluded within a shorter threshold period of time. That is, some prioritization methods may include decisions such as: (a) Has AR information about the object been shown recently? If yes, do not display AR information again. (b) Is the object about to disappear from view within a first threshold time? (c) Is the object about to disappear from view within a second threshold time, shorter than the first threshold time? (d) If yes to (c), do not display AR information. (e) If yes to (b) and no to (c), then prioritize display of AR information for the object. Multiple prioritization levels may be used in (e). For example, some embodiments may assign a prioritization score, with higher prioritization scores typically being assigned to lower persistence predictions. In some embodiments, prioritization scores may then be grouped into prioritization levels. The AR information may then be displayed according to prioritization level, with AR information corresponding to AR pairs having higher prioritization levels or scores being displayed prior to AR information corresponding to AR pairs having lower prioritization levels or scores. In some embodiments, AR information for two or more objects, within the same prioritization level, may be displayed simultaneously. For some embodiments, detection of a first object moving may trigger calculation of persistence prediction values for stationary objects that may be occluded by the moving object, and thus some stationary object AR information may be prioritized.

Figure 5:
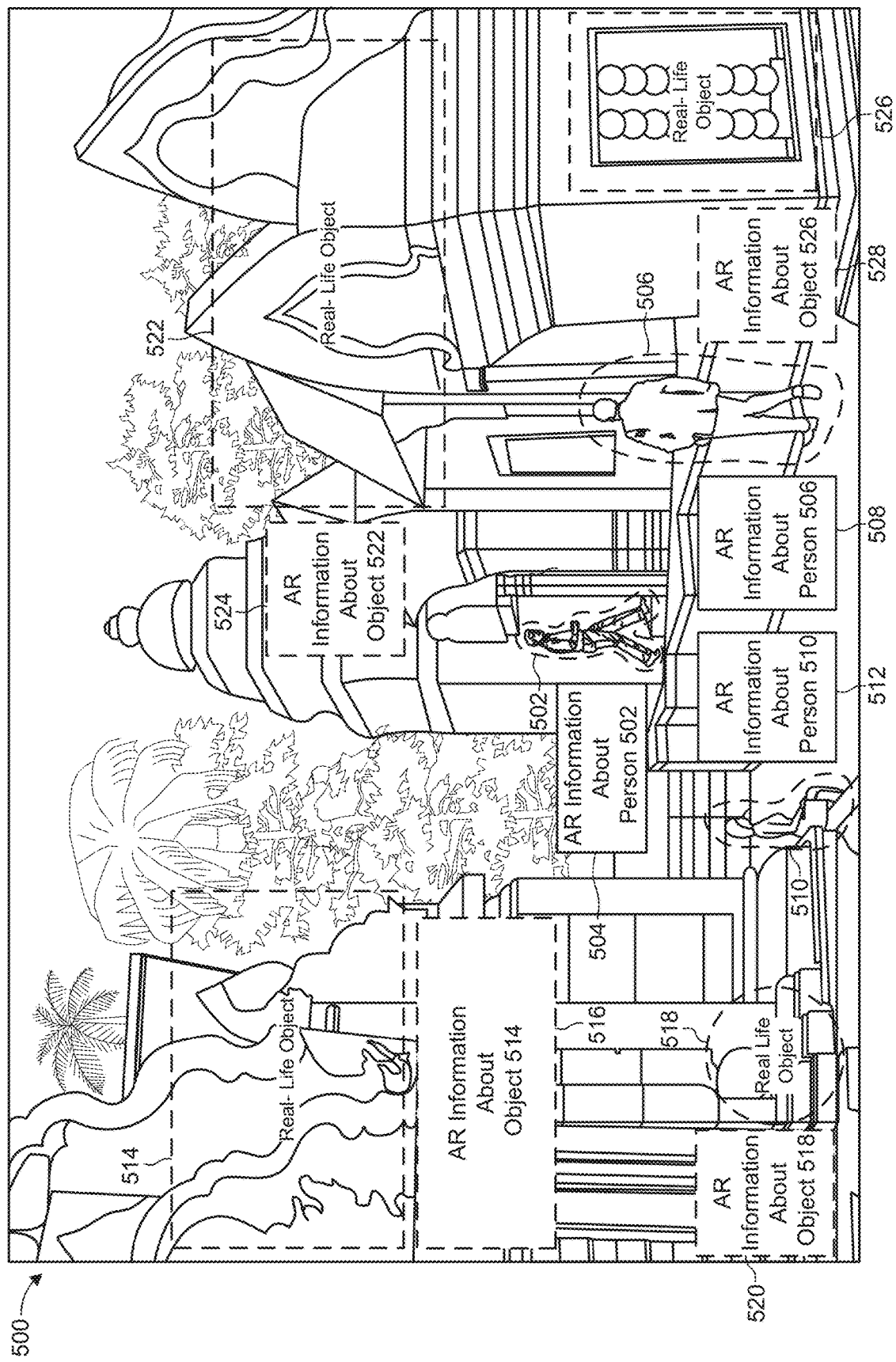
FIG. 5 is an illustration of a user view with AR information for multiple objects, as may be observed with some embodiments.

FIG. 5 is an illustration of a user view 500 with AR information for multiple objects, as may be observed with some embodiments. In this illustrated example, a user is visiting an archeological site, along with some celebrities. Object recognition techniques may be used to detect and recognize both animate and inanimate objects. A first person 502 is walking quickly in a direction such that first person 502 may soon disappear behind a building. A second person 506 is walking away slowly, such that, within the prediction threshold time, second person 506 will remain within view. A third person 510 is sitting, motionless. Other detected objects 514, 518, 522 and 526 are archeological objects, and are thus unlikely to move on their own; any motion of these objects 514, 518, 522 and 526 within user view 500 would be caused by the user's own motion or head motions. In this example, however, the user is standing motionless, with a consistent direction of view.

Based on the predicted persistence values, AR information 504 regarding person 502 may be prioritized over AR information for other detected objects. Prioritization may include displaying first, or, if displaying simultaneously with other AR information, displaying with font size or coloration (text and/or background) in a manner different than non-prioritized AR information, such that it attracts a user's attention more readily. Because of the slower motion of person 506, but expected continued persistence, AR information 508 about person 506 may be prioritized above AR information for stationary archeological objects 514, 518, 522 and 526, but yet below AR information 504 about person 502. Although person 510 is stationary for the time being, but yet is a human capable of motion rather than a stationary archeological object, AR information 512 about person 510 may be prioritized above AR information for stationary archeological objects 514, 518, 522 and 526, but yet below AR information 504 about person 502. AR information 512 about person 510 may be prioritized similarly as AR information 508 about person 506, or lower because person 506 is moving and person 510 is not moving. In some embodiments, multiple prioritization levels may be used, including predicted rapid disappearance, motion but no predicted disappearance, no motion but an object capable of motion, and no motion and the object is of a type for which motion would not be expected.

Mixed Reality Presentation of AR Information

Figure 6:
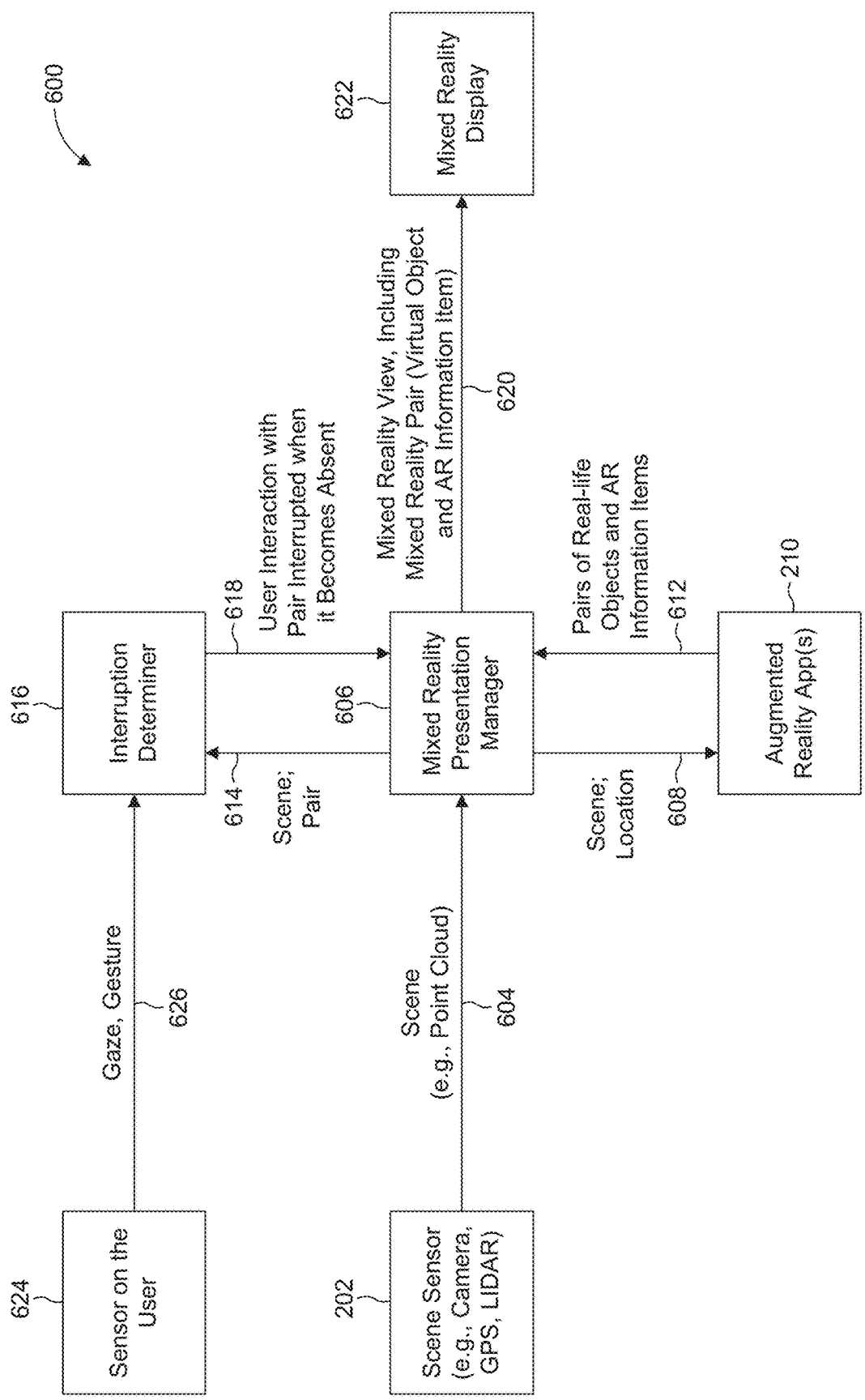
FIG. 6 is a message flow diagram for a method of prioritizing AR information and handling interruptions for an MR system, according to some embodiments.

FIG. 6 is a message flow diagram 600 for an example method of prioritizing AR information and handling interruptions for an MR system, according to some embodiments. As illustrated, one or more scene sensors 202 (for example, a camera, RGB-D sensor, light detection and ranging (Lidar), and/or GPS) provides scene information 604 (e.g., as a point cloud), including possibly location information, to an MR presentation manager 606. MR presentation manager 606 receives scene information 604 and sends combined scene and location information 608 to one or more AR applications (AR Apps) 210. Although AR apps are described, it should be understood that MR apps may also be used. AR apps 210 uses the received information 608 to produce a set of pairs 612 of identified objects (real or virtual) and corresponding AR data. Each pair, in set of pairs 612 includes information identifying an object (possibly using an identification by location coordinates that includes an image of the object and boundary coordinates) along with associated AR data that provides information about the object and may also describe how to render that information in an MR presentation. AR Apps 210 then provides set of pairs 612 to MR presentation manager 606.

MR presentation manager 606 receives set of pairs 612, and sends an identification of the objects 614 to an interruption determiner 616. Additionally, one or more sensors 624 on a UE or user's person may provide information 626 about the user, e.g., a user's gaze and gestures, to interruption determiner 616. Interruption determiner 616 determines which user interaction (e.g. with which object) was interrupted or may soon be interrupted on account of the object becoming absent from a user's view. Interruption determiner 616 may calculate a prediction of when each object may move out of view of the current scene, which may be based on an assumption that the current scene is a sufficiently accurate prediction of what the user will see next. Interruption determiner 616 may send calculated interruption information 618 back to MR presentation manager 606. In some embodiments, MR presentation manager 606 gives greater priority to the presentation AR information and possibly virtual object presentation, based on interruptions. MR presentation manager 606 composes a mixed reality view 620 which may include virtual objects corresponding to occluded real-world objects and associated AR information, and sends the data to an MR display 622. MR display 622 may be a WTRU, such as WTRU 102b.

In some embodiments, MR presentation manager 606 operates on an ongoing basis, performing the following actions: receiving scene information 604, sending scene and location information 608 to AR applications 210, receiving object and AR information pairs 612, sending scene and object information 614 to an interruption determiner 616, receiving interruption information 618, composes a mixed reality view which may include virtual objects corresponding to real-world objects and associated AR information, and sending display information 620 to an MR display 622.

Figure 7:
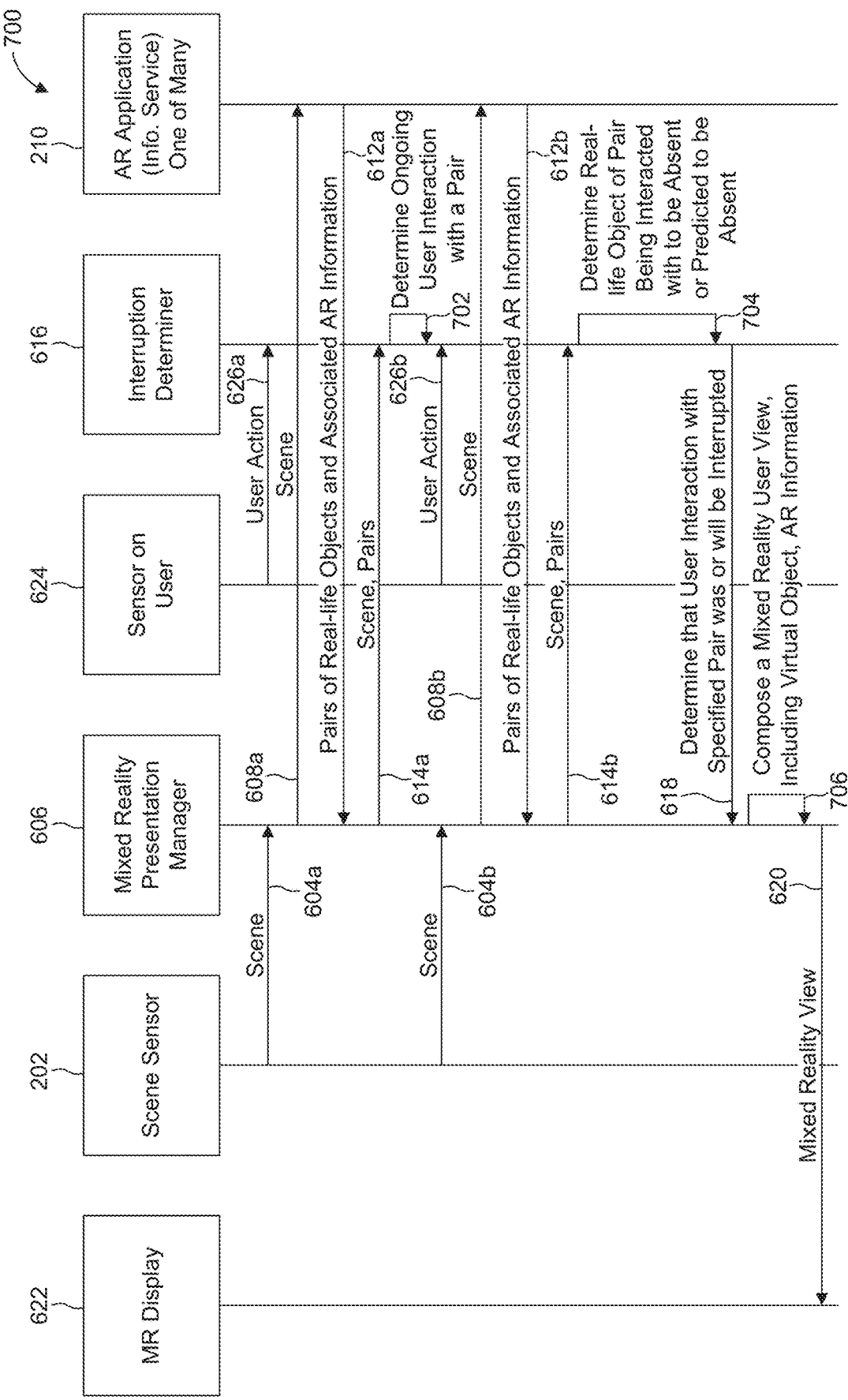
FIG. 7 is a message sequence diagram for a creating an MR presentation, possibly including AR information, and handling interruptions for an MR system, according to some embodiments.

FIG. 7 is a message sequence diagram 700 for an example method of creating an MR presentation, possibly including AR information, and handling interruptions for an MR system, according to some embodiments. Scene sensor 202 sends initial scene information 604a to MR presentation manager 606. MR presentation manager 606 may be a device, such as a server, or a cloud-based module. One or more sensors 624 on a UE or user's person may provide initial information 626a about the user, e.g., a user's gaze and gestures, to interruption determiner 616. MR presentation manager 606 sends initial scene and location information 608a to AR application (or information service) 210, which may be one of many AR apps. AR app 210 may be a software module resident in the cloud. AR app 210 may send initial pairs 612a of objects and AR information to MR presentation manager 606. MR presentation manager 606 sends initial scene and objects 614a to interruption determiner 616. Interruption determiner 616 then determines 702 whether there is any ongoing interaction between a user and a pair.

The following may occur multiple times, as the MR session may be an ongoing process: One or more sensors 624 may provide updated information 626b about the user, e.g., a user's gaze and gestures, to interruption determiner 616. MR presentation manager 606 sends updated scene and location information 608b to AR application 210. AR app 210 sends updated pairs 612b of objects and AR information to MR presentation manager 606. MR presentation manager 606 sends updated scene and objects 614b to interruption determiner 616. Interruption determiner 616 determines 704 which user interaction (e.g. with which object) was interrupted or may soon be interrupted on account of the object becoming absent from a user's view. Interruption determiner 616 may send that data as interruption information 618 to MR presentation manager 606. MR presentation manager 606 composes 706 a mixed reality view which may include virtual objects corresponding to occluded real-world objects and associated AR information. MR presentation manager 606 sends scene information augmented with selected AR information 620 to an MR display 622, which may be part of a UE.

FIGS. 8A-8D are illustrations of MR user views for actual and virtual objects under various conditions, as may be observed with some embodiments. FIG. 8A shows a scene 800a at time t=0. In this illustrated example, the user's view includes real-world circle object 402, triangle object 404, and building 406. The pentagon shape is AR information window 804, pertaining to circle object 402. Circle object 402 is moving, while triangle 404 and building 406 are stationary. FIG. 8B shows a scene 800b at time t=T1. Circle object 402 is hidden from view (occluded) by building 406. The system determines that the user interaction is not complete, for example the AR information window 804 had not been displayed for sufficient time for the user to have completed reading the material. Thus, a virtual circle object 802 is displayed (e.g., in some embodiments, based on an expected position of where the circle object 402 would be if not for being hidden from view by building 406), along with the associated AR information window 804.

FIG. 8C is a scene 800c at time t=T2. Real-world circle object 402 re-emerges into view. The interruption determiner and MR presentation manager together determine that (a) the user interaction is not over (more time is needed for the user to read AR information window 804), and (b) since real-world circle object 402 is in view, virtual circle object 802 is no longer needed. FIG. 8D is a scene 800d at time t=T3. The circle has moved out of view, not behind another object but out of the view of the camera. The interruption determiner and MR presentation manager together determine that (a) the user interaction is still not yet over (more time is needed for the user to read AR information window 804), and (b) since real-world circle object 402 has disappeared from view, virtual circle object 802 is now needed again. Virtual circle object 802 is placed, e.g., nearby where real-world circle object 402 exited view, since that would be an intuitive location for a user to look for AR information window 804. In this way, despite occlusion and disappearance, user interaction continued without interruption, giving continuity to the user's experience. In some embodiments, the virtual circle object 802 may be still be triggered by virtual circle object 802 disappearing from view but virtual circle object 802 may be placed elsewhere, e.g., further away or elsewhere entirely, from where real-world circle object 402 exited view.

Determining interruption of a user's interaction with the received pair may depend upon the nature of the interaction. One method may be to use detection of where a user's eyes have settled on an AR information window, and comparing those regions with the regions containing text. Various techniques may be used to track user gaze, as suitable. FIGS. 9A-9D are illustrations showing example locations of user gazes within an example AR information text window, for example the pentagon AR information window 804 of FIGS. 8A-8D.

Figure 9B:
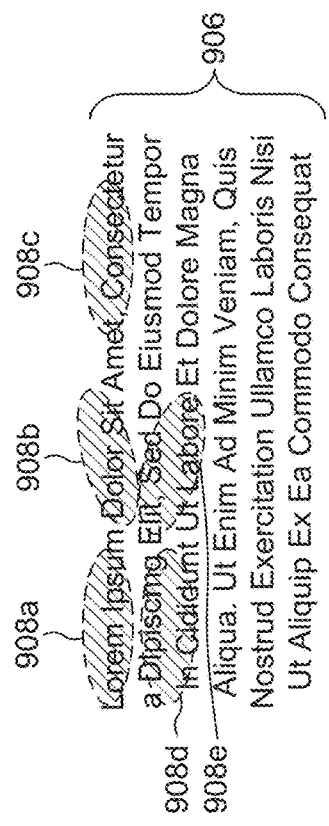
FIGS. 9A-9D are illustrations showing example locations of user gazes within example AR information text.
Figure 9D:
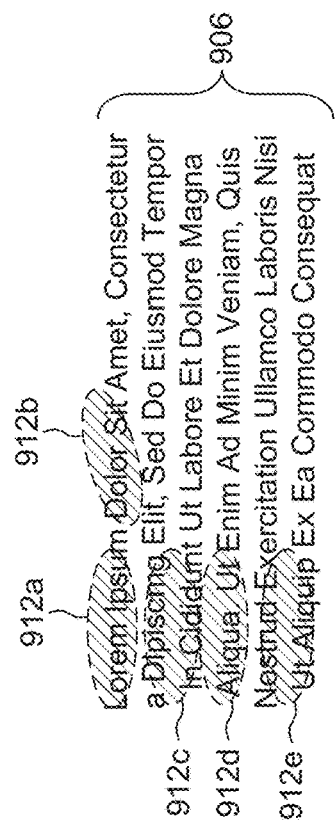
Figure 9A:
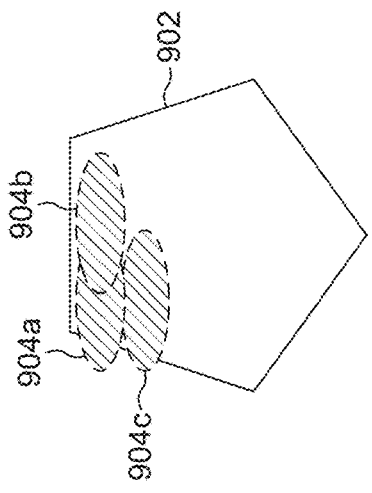
Figure 9C:
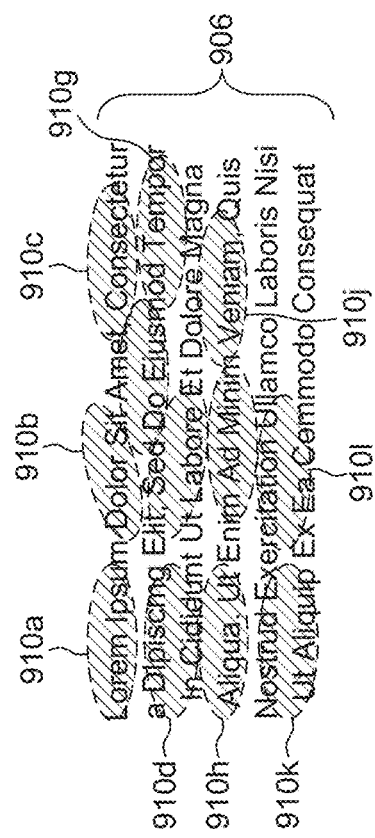

The dashed circles with hashed shading in FIGS. 9A to 9D indicate where the user's gaze has settled. FIG. 9A shows a pentagon-shaped AR information window 902 upon which AR information may be presented to a user. The detected gaze locations 904a-904b cover only a small portion of window 902, indicating that, if the user interaction stops, there will be an interruption. FIG. 9B shows a similar scenario in which a user has not completed an interaction, although using text block 906, rather than information window 902. The detected gaze locations 908a-908e cover only a small portion of text block 906, indicating that the user has not completed reading all of the text. For FIG. 9C, the detected gaze locations 910a-910l indicate that the user has read nearly all of the text. Thus, if the interaction stops, there may not be an interruption, or the interruption will not be significant. For FIG. 9D, the detected gaze locations 912a-912e indicate that the user has read significant portions (here determined to be the starting fragments of each line), suggesting that a user is speeding through the text and indicating that there is no interruption.

Other methods for determining interruption of a user's interaction with AR information may also be used, in some embodiments. An exemplary "short duration" interaction may be specified as one second or less. If a user's interaction with a pair (object and AR information) involves interacting with a real-world object in the pair and if the user's gaze settled upon any part of the real-world object within a short duration prior to when the real-world object becomes absent, the user's interaction with the real-world object may be determined to be interrupted. If the user's interaction with the pair involves interacting with the associated AR information, the method may use attributes of the AR information in determining if an interruption of a continuing user action has occurred.

For example, in scenarios in which AR information item has a spatial extent (e.g., as in a picture or a text snippet being displayed) then, if for a short duration prior to the moment when the real-world object becomes absent, the user's gaze had settled somewhere on that AR information without covering nearly the full spatial extent, then the user's interaction may be determined to have been interrupted. This would be the scenario shown in FIG. 9B, if, at the time the user's gaze had reached gaze location 908e, the object disappeared from view.

If AR information that has a temporal extent (e.g., as in an audio clip or a video clip), and the entire AR information had not been played back when the real-world object becomes absent, the user's interaction may be determined to be interrupted. For a video clip, if the user's gaze is upon the video clip a short duration prior to a real-world object becoming absent but the video clip has not terminated, the user's interaction may be determined to be interrupted. For an audio clip, if a short duration prior to the real-world object becoming absent, the user's gaze is upon some part of the scene related to the object while the audio is playing but the audio clip has not terminated, the user's interaction may be determined to be interrupted. The case where a user's gaze is upon a real-world object while the audio plays is discussed below.

Creating a mixed reality view enables a user to continue interacting with a pair by placing a mixed reality representation of the pair in a scene. Systems and methods described herein in accordance with some embodiments may use the background to anchor the scene so that the virtual representation of the real-world object may be placed in a location natural to the user. For one embodiment, this method may be used where the scene has completely changed and no constant background is detected. To determine the coordinates and a velocity of the object, a motion tracking method may be used. An exemplary tracking method that may be used is a method that uses input rangefinder data and outputs coordinates and a velocity of an object as described in Christoph Mertz, et al., *Moving Object Detection with Laser Scanners*, 30(1) J. Field Robotics 17-43 (2013), available at https://www.ri.cmu.edu/pub_files/2013/1/rob21430.pdf.

If the real-world object is not visible in the current scene and another object is detected along the ray from the user's eyes to the predicted coordinates of the real-world object, the real-world object may be determined to be occluded by the first object on the ray going from the user's eyes to the real-world object. There may be multiple occluding objects for a partially overlapping effect.

Figure 10A:
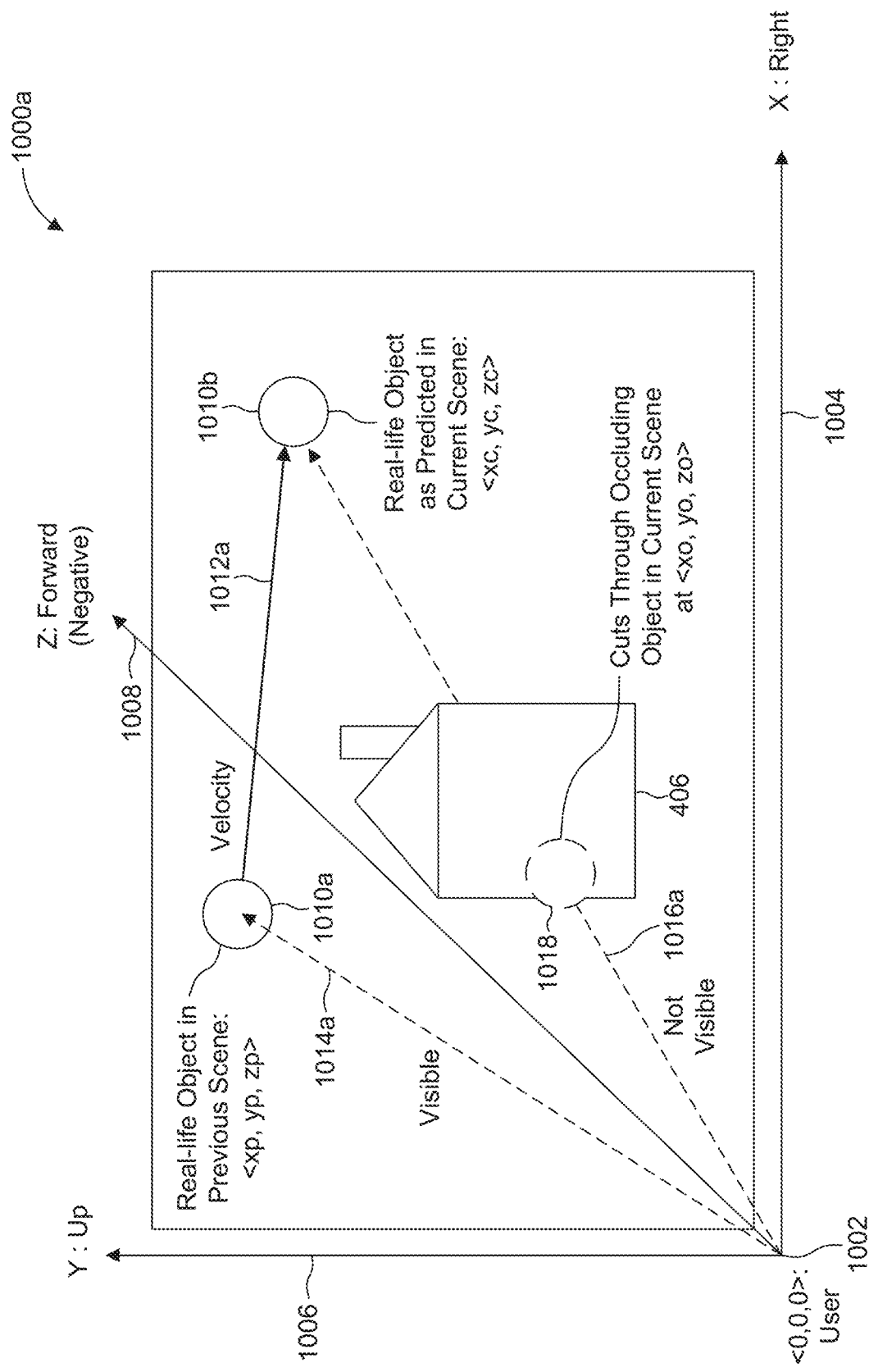
FIGS. 10A-10C are illustrations of MR user views with a moving object, under various scenarios, as may be observed with some embodiments.
Figure 10B:
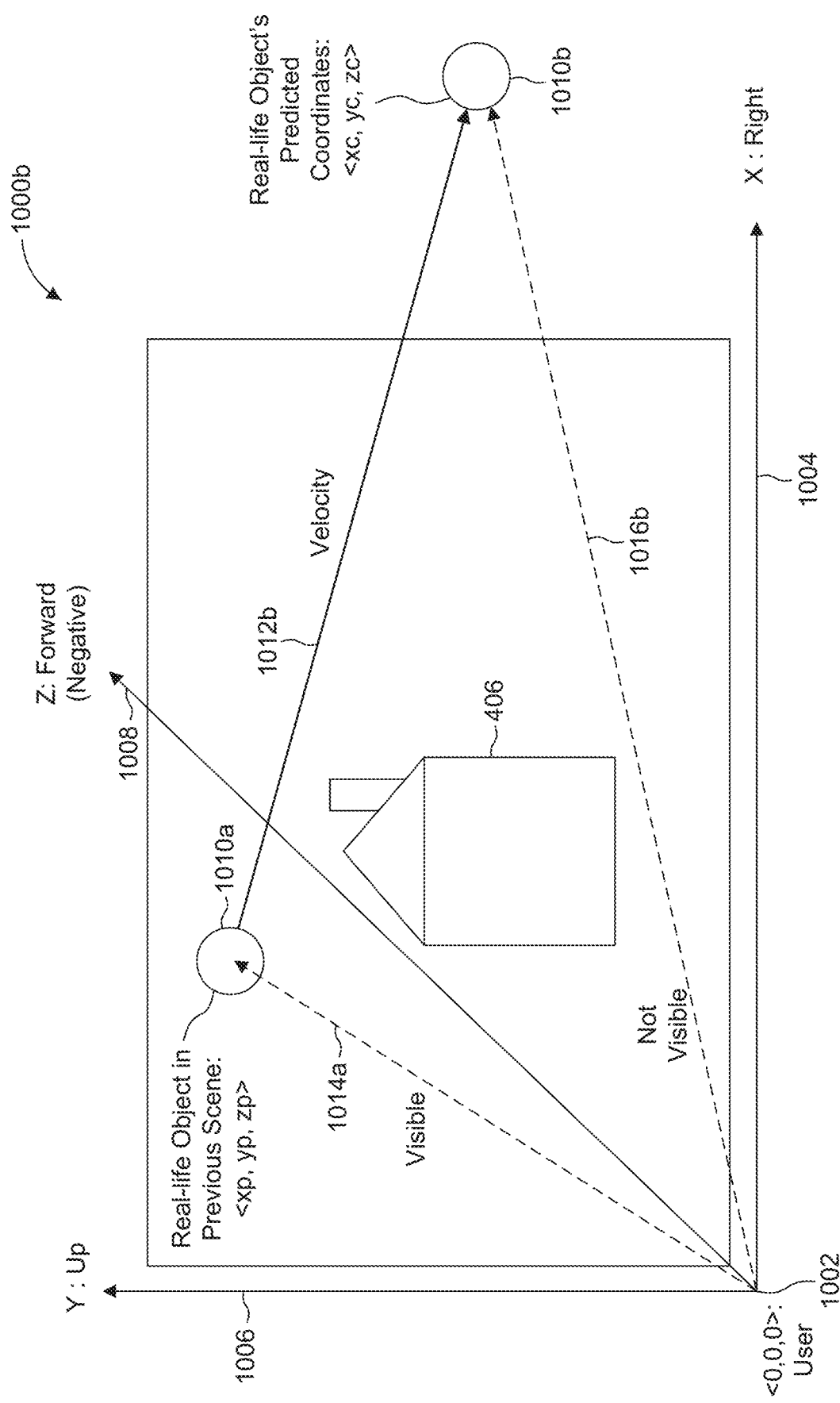
Figure 10C:
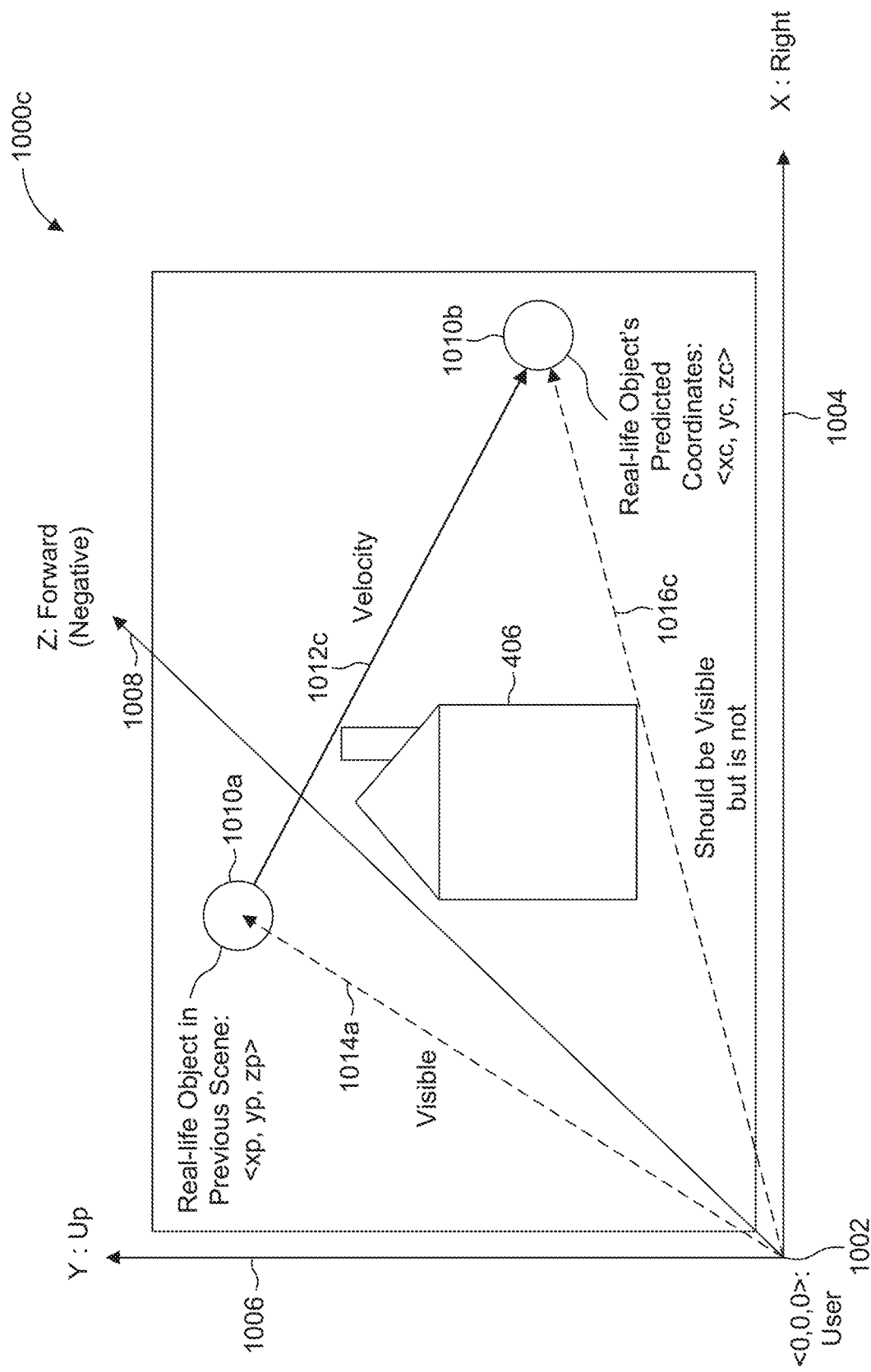

FIGS. 10A-10C are illustrations of MR user views with a moving object, under various scenarios, as may be observed in some embodiments. To indicate the 3D nature of the layouts, coordinate axis, beginning from origin 1002 is shown, where x=0, y=0, and z=0. The x-axis 1004, y-axis 1006 and negative z-axis 1008 are illustrated for reference. In the example illustrated by FIG. 10A, a real-world circle object 1010a in scene 1000a becomes occluded by building 406 as real-world circle object 1010a moves along motion vector (velocity) 1012a from its initial position <xp, yp, zp> to position 1010b at coordinates <xc, yc, zc>. Sight vector 1014a indicates that real-world circle object 1010a is visible, initially. Sight vector 1016a indicates that real-world circle object 1010a is occluded when in position 1010b, and so interruption determiner and MR presentation manager together may determine that a virtual representation 1018 of circle object 1010a is needed and should be placed along sight vector 1016a. This location is specified by the coordinates <xo, yo, zo>. If circle object 1010a continues moving and reappears on the right side of building 406 as viewed by the user, virtual representation 1018 may no longer be used.

In the example illustrated by FIG. 10B, circle object 1010a exits scene 1000b by moving along motion vector 1012b from its initial position <xp, yp, zp> to position 1010b at coordinates <xc, yc, zc>. Sight vector 1014a indicates that circle object 1010a is visible, initially. Sight vector 1016b indicates that circle object 1010a is absent from scene 1000b, and so interruption determiner and MR presentation manager together may determine that a virtual representation (not shown) may be needed nearby the location where circle object 1010a exited scene 1000b.

In some embodiments, a virtual representation of a real-world object, for example virtual representation 1018 for circle object 1010a, may be placed in the scene at coordinates where the relationship between the missing object and some objects in the background remains fixed. A user may find placing the missing object at a location fixed to background objects more natural for the user to continue interacting with the real-world object or its associated AR information without losing continuity. For example, if a car is seen as to the right of a light pole, an image of the missing car may also be displayed to the right of that light pole.

In some situations, however, a real-world object may move in an unpredicted manner, and may vanish in a surprise (unpredicted) absence. In the example illustrated by FIG. 10C, circle object 1010a started within scene 1000c its initial position <xp, yp, zp>, and a motion vector 1012c was calculated for it, predicting possible occlusion by building 406 and reemergence at position 1010b at coordinates <xc, yc, zc>. Position 1010b at coordinates <xc, yc, zc> should be visible, based on sight vector 1016c. However, circle object 1010a is absent from scene 1000c. Thus, interruption determiner and MR presentation manager together may determine that a virtual representation (not shown) is needed and should be placed along sight vector 1016c, at or nearby the position 1010b where circle object 1010a would have been predicted to remerge. This location 1010b is specified by the predicted coordinates <xc, yc, zc>. In some embodiments, if the circle object 1010a continues moving and eventually reappears on the right side of building 406 as viewed by the user and (somewhat) as originally predicted, virtual representation 1018 may, e.g., no longer be used and the scene 1000c will revert to showing the circle object 1010a, in, e.g., its now current location.

Figure 11A:
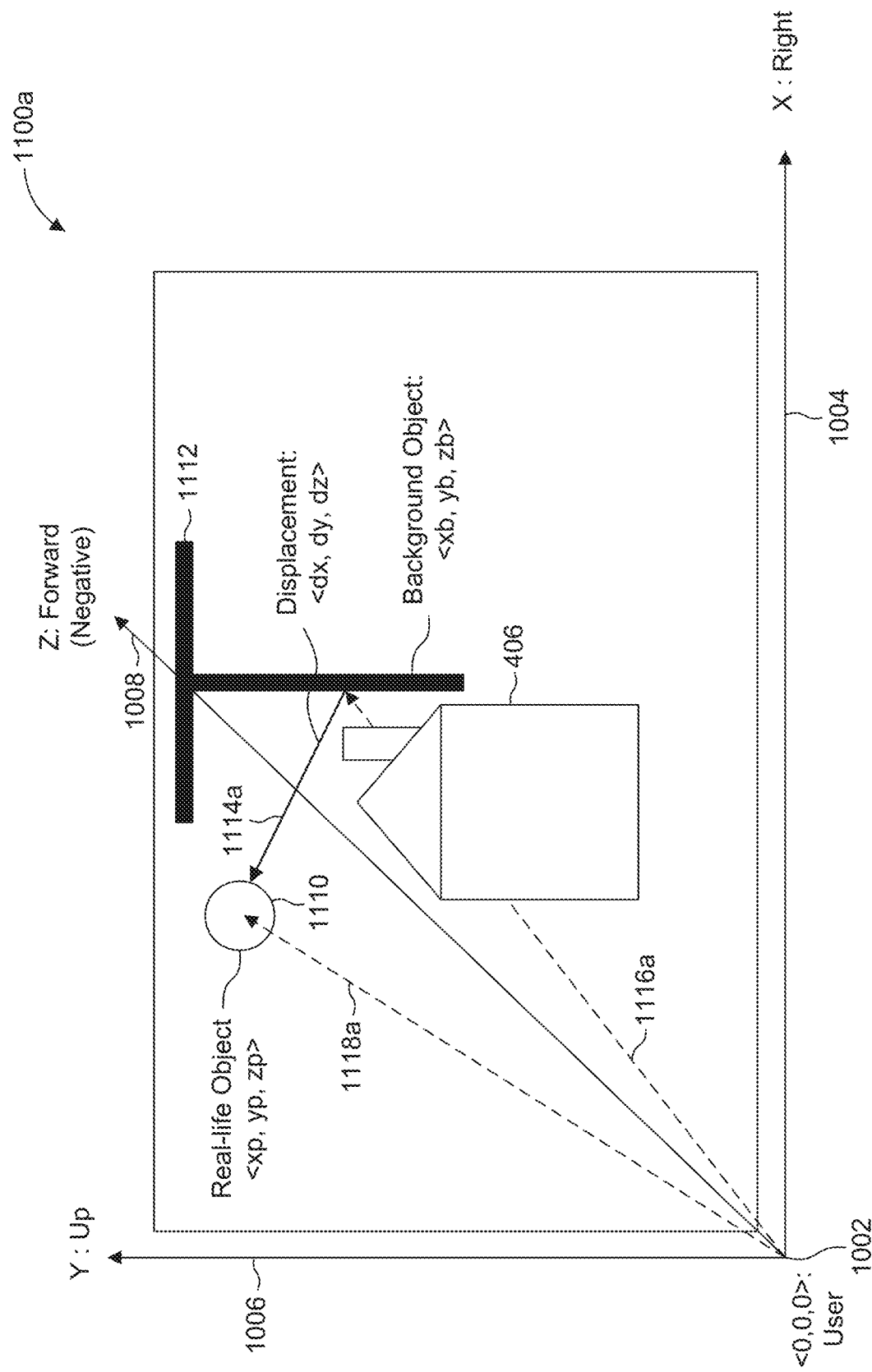
FIGS. 11A-11C are illustrations of MR user views involving calculation of displacement or placement of objects, as may be observed with some embodiments.
Figure 11B:
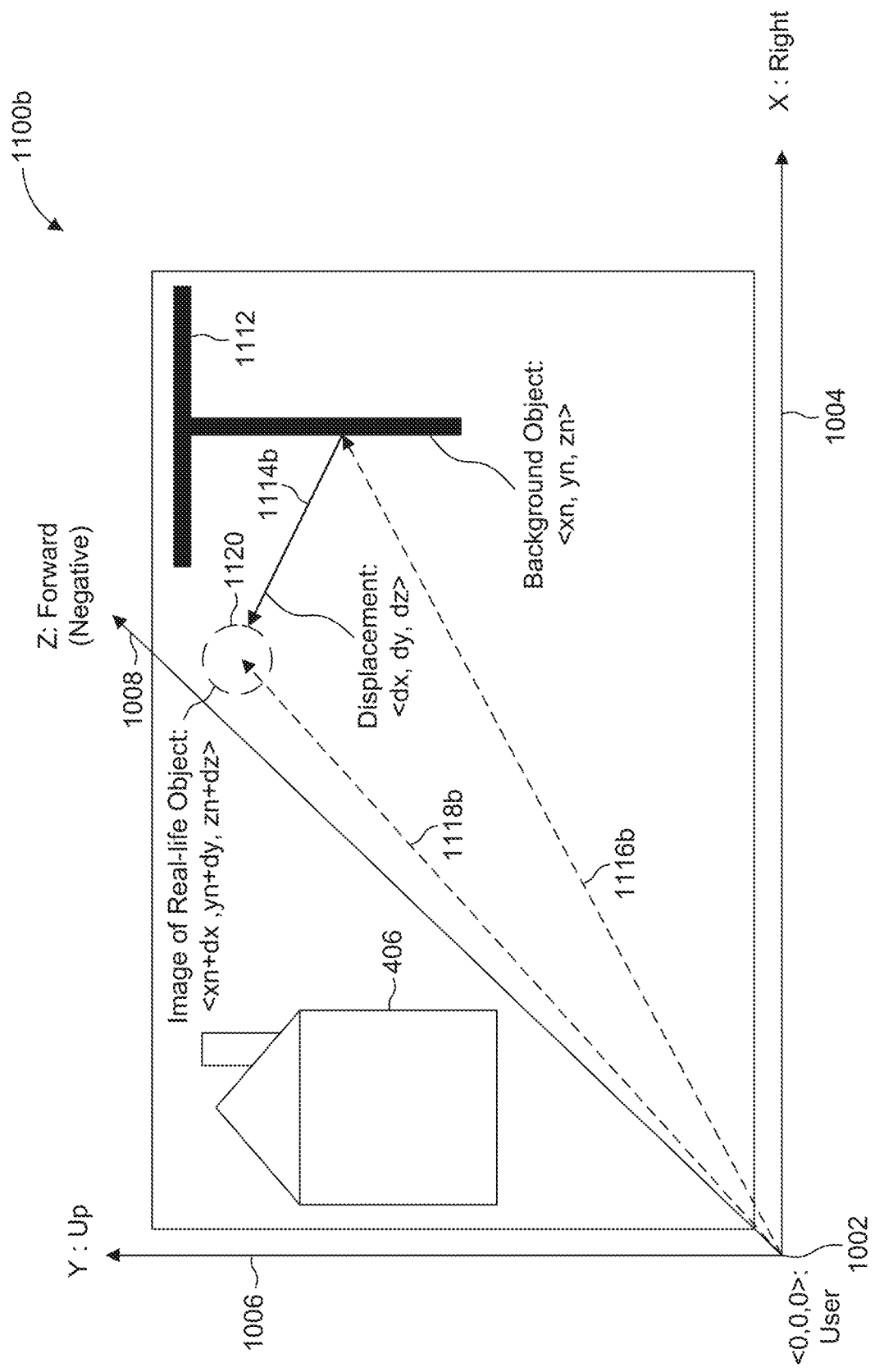
Figure 11C:
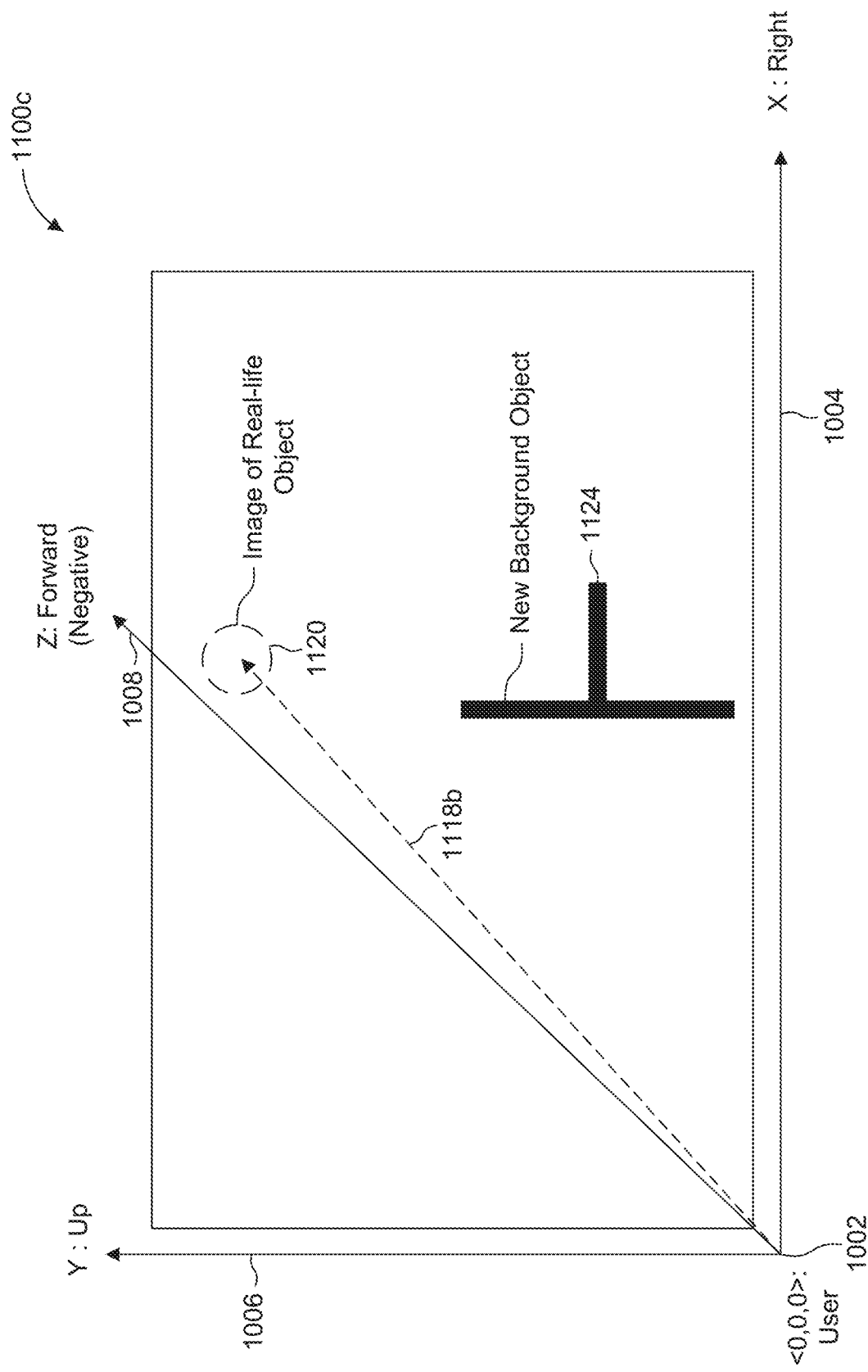

FIGS. 11A-11C are illustrations of MR user views involving calculation of displacement or placement of objects, as may be observed in some embodiments. In FIG. 11A a background object 1112 is shown anchored at location <xb, yb, zb> in scene 1100a. A displacement vector 1114a is calculated as the difference between the coordinates <xp, yp, zp> of an object 1110 and the location of background object 1112. This displacement is indicated by <dx, dy, dz>. There is a sight vector 1116a from origin 1002 to background object 1112, and a sight vector 1118a from origin 1002 to object 1110. The sight vectors 1116a and 1118a may be used in determining coordinates, in some embodiments.

FIG. 11B depicts the scenario in which the user has changed positions and is now viewing scene 1100b. Object 1110 is no longer visible, perhaps due to occlusion by building 406, or perhaps because object 1110 moved out of view. Thus, a virtual representation 1120, which may be a 3D model or 2D image, of object 1110 is to be used for user interaction, such as display of AR information. In this example, virtual representation 1120 will be placed at an anchoring location of <xn+dx, yn+dy, zn+dz>. This location is based on displacement vector 1114a from background object 1112, as was calculated for scene 1100a (of FIG. 11A). The calculation of <dx, dy, dz> is shown in FIG. 11A.

There is a sight vector 1116b from origin 1002 to background object 1112, and a sight vector 1118a from origin 1002 to representation 1120. The sight vectors 1116*b* and 1118*b* may be used in determining coordinates, in some embodiments.

FIG. 11C depicts the scenario in which the user has changed positions again and is now viewing scene 1100*c*. None of object 1110, background object 1112, and building 406 are visible, although a new background object 1124 is visible. Thus, there is no anchor point for a displacement vector to define the display location of representation 1120 in scene 1100*c*. Therefore, in some embodiments, representation 1120 will be placed according to sight vector 1118*b*, so that it is in the same location with respect to the frame of reference as representation 1120 had been placed in scene 1100*b*, as shown in FIG. 11B.

In some embodiments, AR information associated with an object may be presented to the user in a way that the user associates the AR information with an object of the real-world. One exemplary embodiment of such a presentation uses the same modality as may have been used for other AR information in the current settings, so that the user readily associates the presented AR information with the real-world object whose image is being shown. For some embodiments, if the AR information has spatial extent, e.g., a picture or a text snippet, all of the AR information continues to be shown. For some embodiments, if the AR information has temporal extent, e.g., an audio or video clip, the AR information is presented from where the AR information was last interrupted.

In some embodiments, a determination that the interaction has not ended depends upon the content of the AR information, e.g., if a video clip is 30 seconds long. In some embodiments, determination that the interaction has not ended depends upon the observations of the user, e.g., the user's gaze. In some embodiments, the image for the real-world object that has disappeared from view without exiting the scene is displayed at its predicted coordinates instead of relating the image to the background. In some such embodiments, doing so may avoid having to compute the background of the scene.

In some embodiments, a video of a real-world object as it traveled across part of the user's view may be displayed with the appearance of the real-world object transformed to indicate that it is not present. A video representation may be used if a real-world object is traveling at a steady velocity and is occluded by something else in the user's view. In some embodiments, a slow-motion video of a real-world object is displayed as the real-world object traveled across part of the user's view. The slow-motion video modality may be used if the real-world object departs from the edge of the user's view.

Figure 12A:
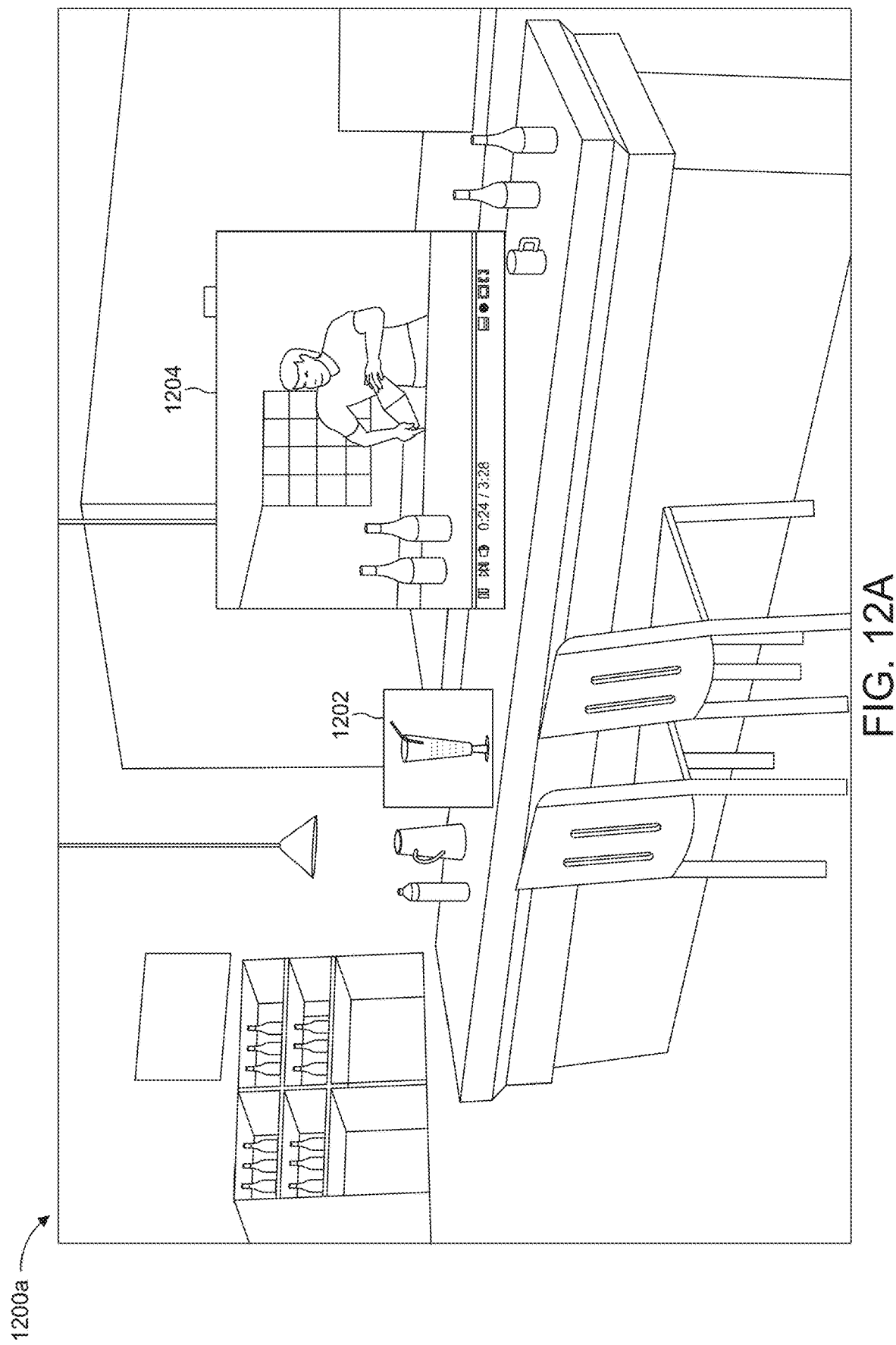
FIGS. 12A-12B are AR/MR user views for a scenario in which an object is obscured, as may be observed with some embodiments.
Figure 12B:
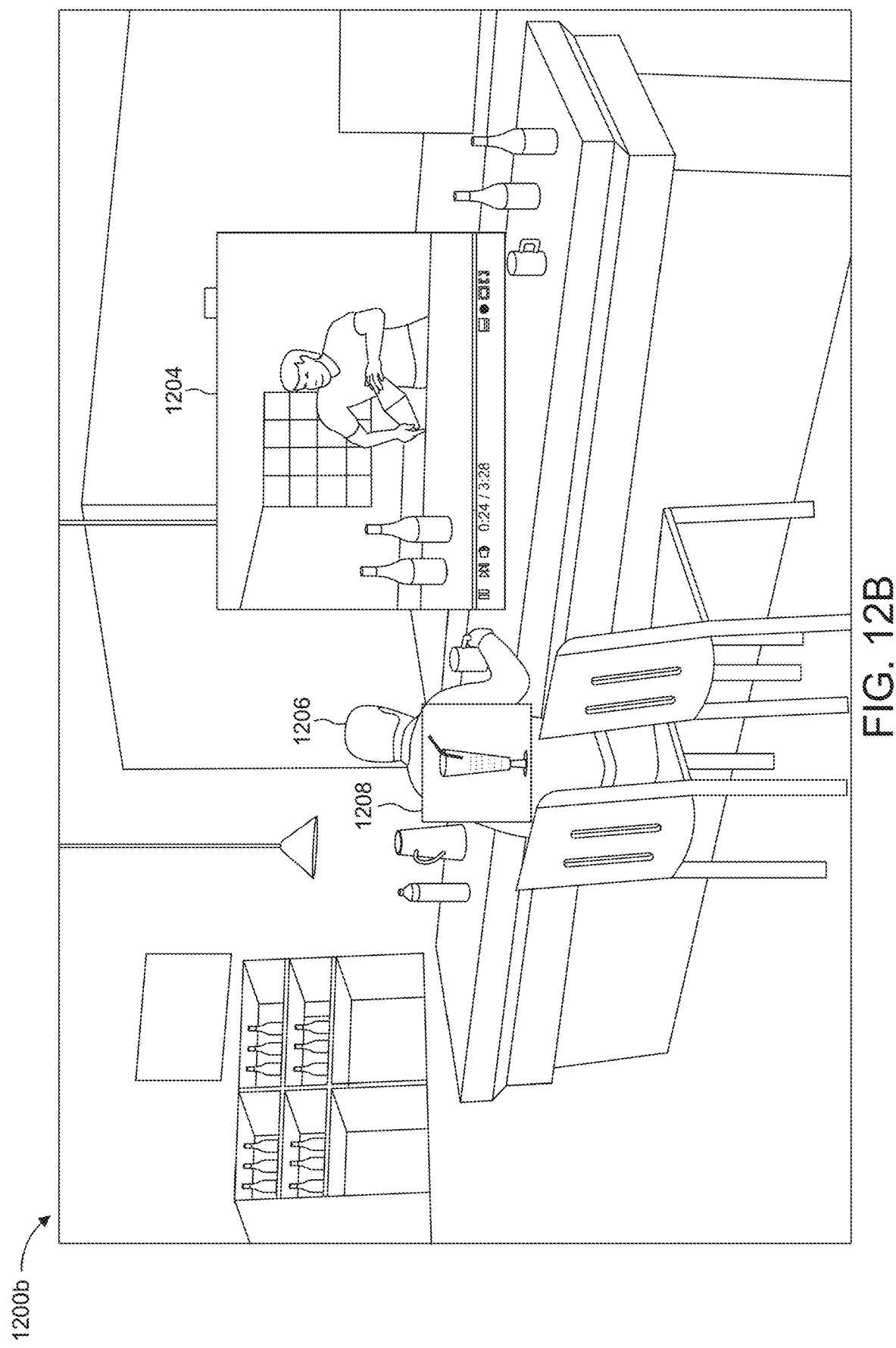

FIGS. 12A-12B are AR/MR user views for a scenario in which an object is obscured, as may be observed with some embodiments. FIG. 12A illustrates an AR view for a video on creating a mixed drink in an exemplary use case. A user encounters a particular mixed drink 1202 on a counter. An AR presentation manager outlines mixed drink 1202 and displays AR information 1204, in the form of a video clip on making the drink, as scene 1200*a*. The video clip begins playing in the user's MR display.

FIG. 12B illustrates the situation in which an occluding object 1206 (a person) obscures the mixed drink 1202 prior to the completion of the video in AR information 1204. Therefore, a virtual representation 1208 is placed at the last identified location of mixed drink 1202, and the video clip in AR information 1204 continues to play.

Figure 13A:
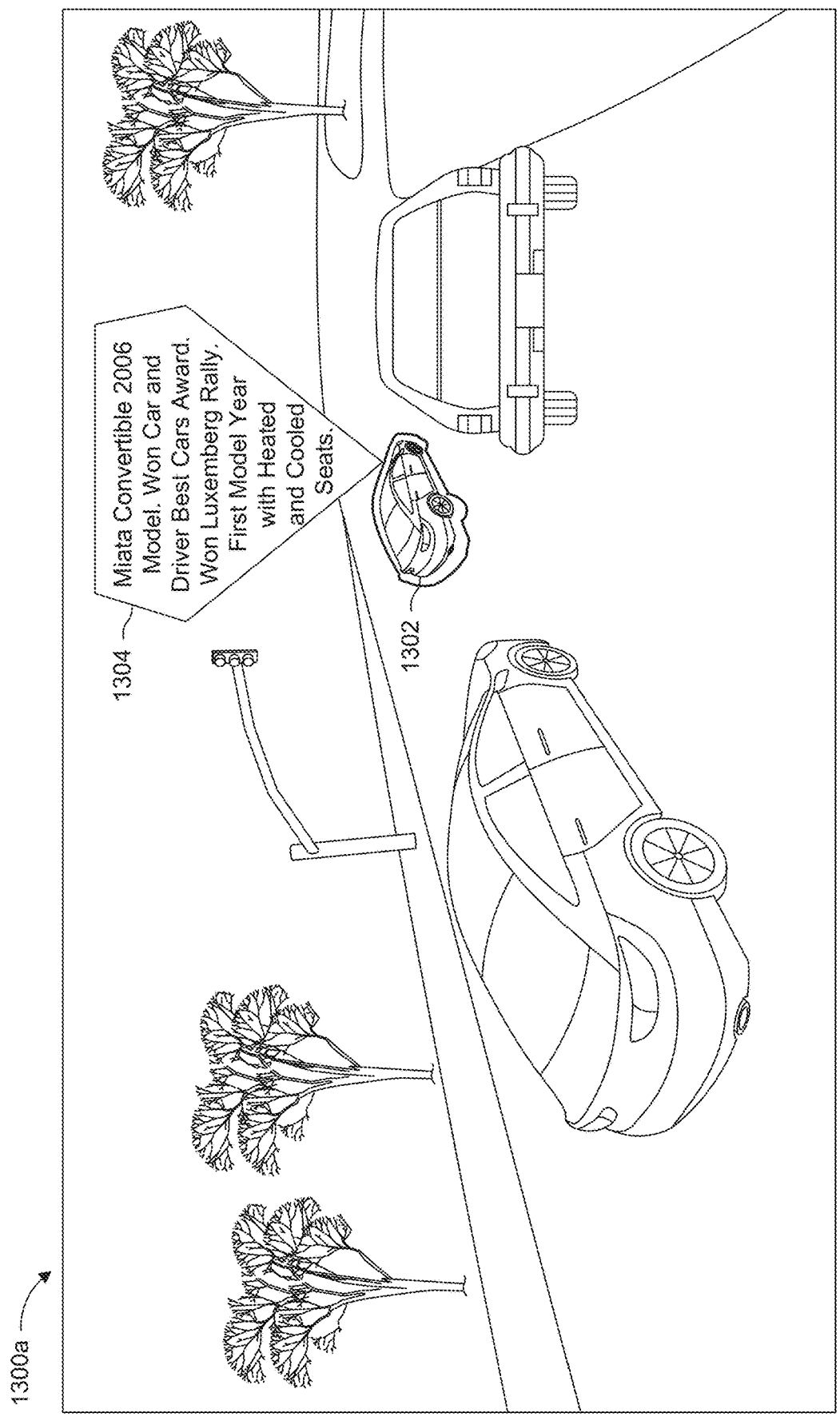
FIGS. 13A-13B are AR/MR user views for a scenario in which an object moves out of view, as may be observed with some embodiments.
Figure 13B:
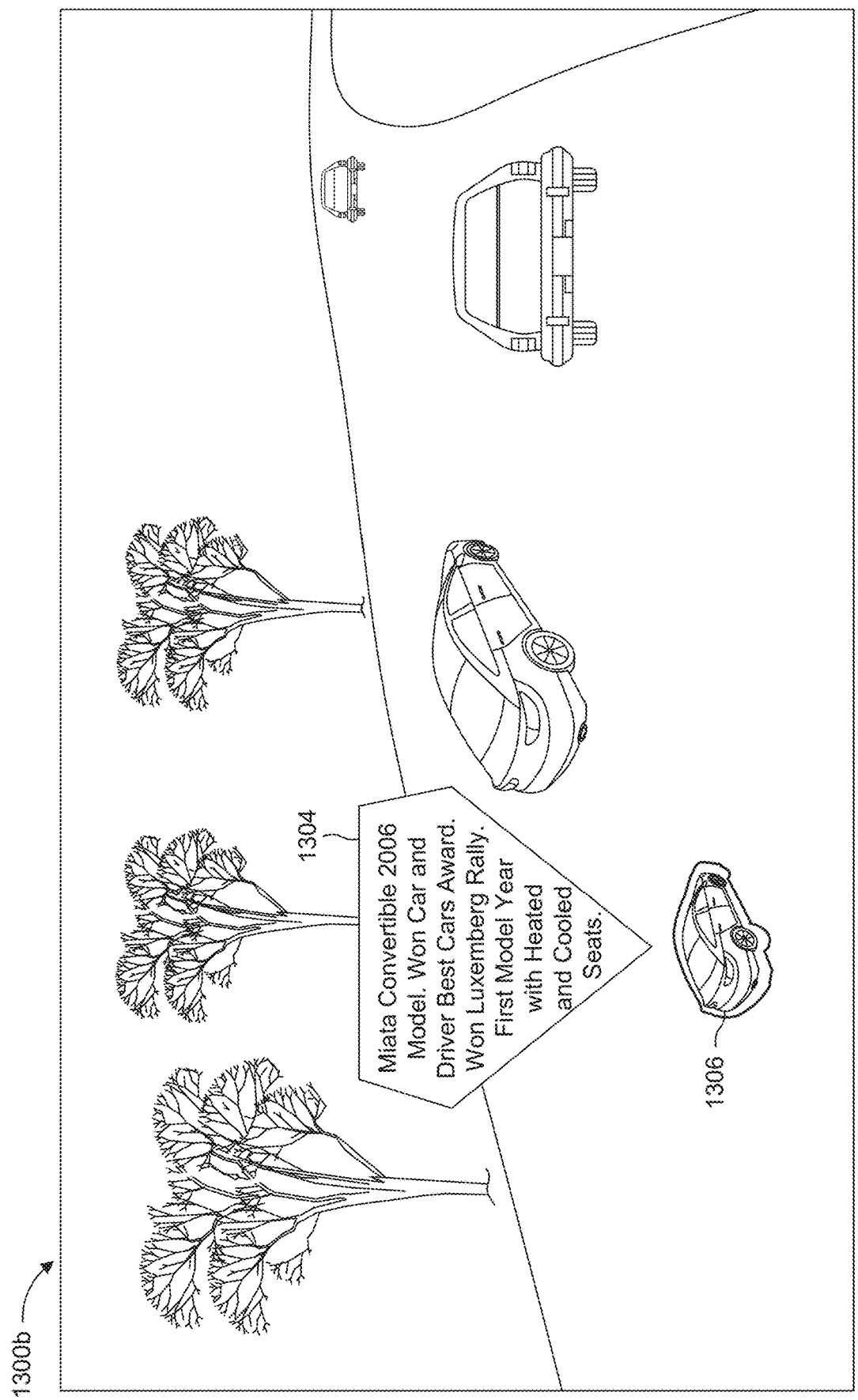

FIGS. 13A-13B are AR/MR user views for a scenario in which an object moves out of view, as may be observed with some embodiments. As illustrated in FIG. 13A, an AR app using object detection and recognition algorithms has identified a particular model of car 1304 in scene 1300*a*, and has displayed AR information as text in AR information window 1304. Additionally, car 1302 is outlined to highlight it for the user's attention. In this example car 1302 is stopped at a red traffic light. An image is captured of car 1302 for later use as a virtual representation, in the event that car 1302 disappears from view prior to the user having time to finish reading the AR information text.

FIG. 13B illustrates the interruption scenario in scene 1300*b*. The traffic light had changed, and car 1302 sped away, out of view. Using systems and methods disclosed herein in accordance with some embodiments, the user's interaction with car 1302 may be determined to be interrupted. Therefore, according to the example, an image 1306 of car 1302 is placed in the user's MR display, and AR information window 1304 is associated with image 1306, since real-world car 1302 is absent. Various techniques for locating a virtual representation or image may be used in differing embodiments. For example, an image may be placed in the same relative location within a scene relative to a background, or in the same viewing direction.

Heads-Up Vehicle Display

Figure 14A:
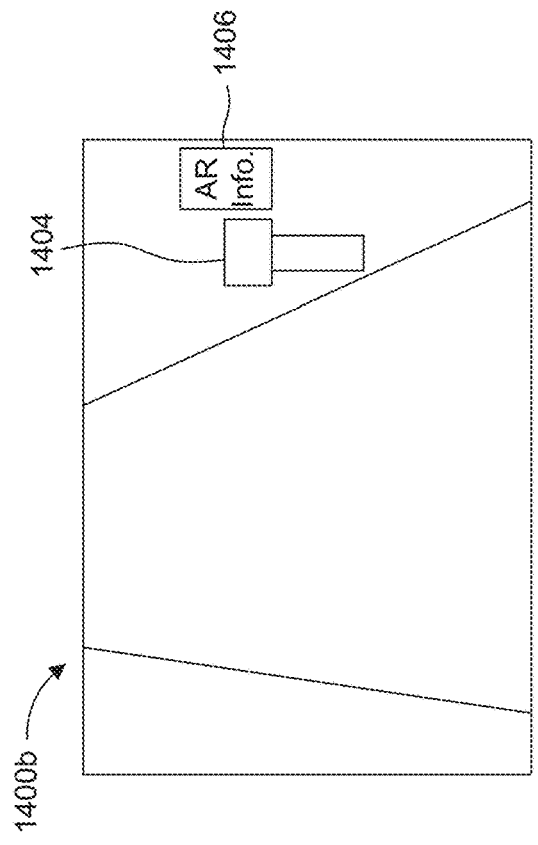
FIGS. 14A-14E are illustrations of a heads-up AR display in various scenarios, as may be observed with some embodiments.

FIGS. 14A-14E are illustrations of a heads-up AR display in various scenarios, as may be observed with some embodiments. Some embodiments may be implemented as a heads-up display in an automobile, to assist a driver or passenger (either being the user) with a view out of the car's windshield. In some embodiments, images may be captured with a forward facing camera on or inside the car. FIG. 14A shows a view 1400*a* out of a car windshield, at a time t=0, with two signs 1402 and 1404 in view. No AR information is yet displayed.

Figure 14B:
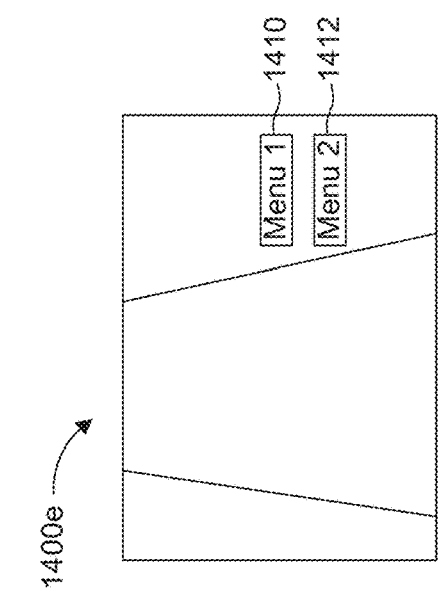

FIG. 14B shows a view 1400*b* out of the car windshield, at a slightly later time t=T1, when sign 1404 is still in view, but sign 1402 has been passed and is no longer in view. AR information 1406, regarding sign 1404 is displayed on a heads-up display for the user.

Figure 14C:
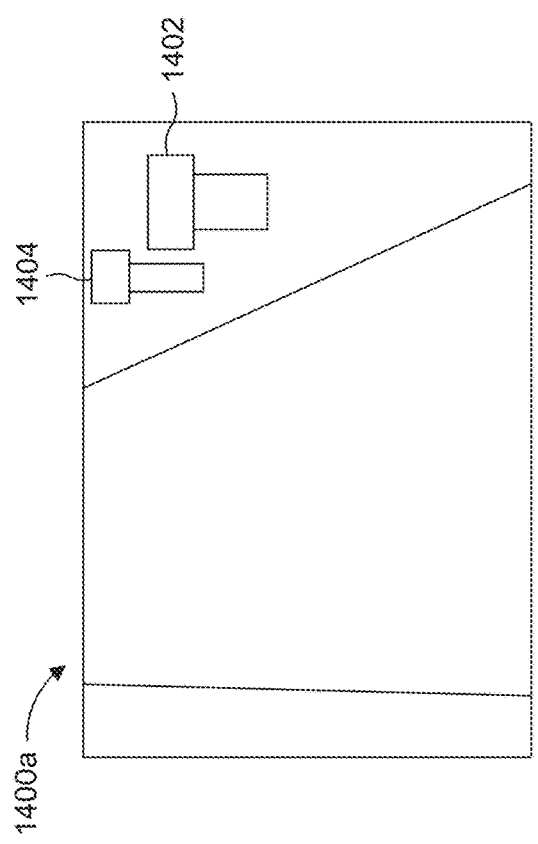
Figure 14D:
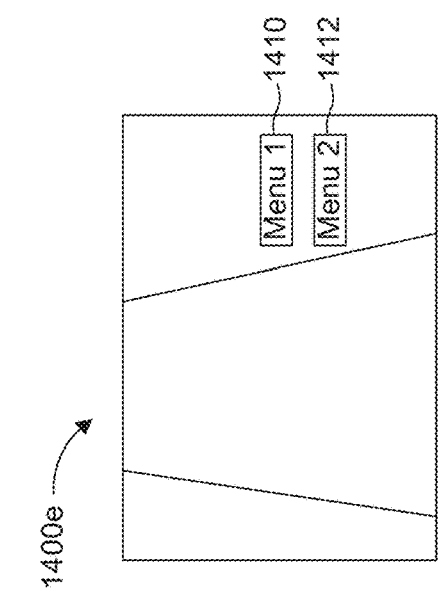

FIG. 14C shows a view 1400*c* out of the car windshield, at the slightly later time t=T1, when sign 1404 is still in view, but sign 1402 has been passed and is no longer in view. Rather than displaying AR information as text, an icon 1408, related to sign 1404 is displayed on a heads-up display for the user. In some embodiments, if the user taps the icon in the heads-up display, more information related to sign 1404 may be provided. FIG. 14D shows a view 1400*d* out of the car windshield, at the slightly later time t=T1, similar to view 1400*c* of FIG. 14C, but with a different example location for icon 1408. In some embodiments, if a user has gazed at a recognized sign, e.g., for less than a first threshold time period but greater than a second threshold time period, AR information or an icon related to the sign will be displayed.

Figure 14E:
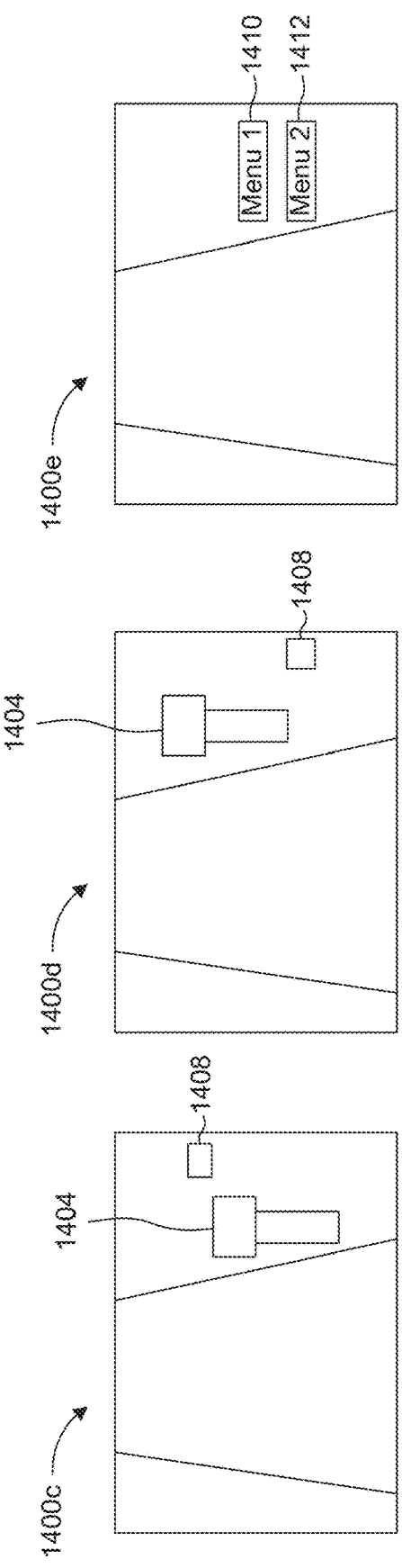

FIG. 14E shows a view 1400*e* out of the car windshield, at a later time t=T2, when both sign 1402 and sign 1404 have been passed and are no longer in view. Two menus, 1410 and 1412 are presented that may be related to sign 1402 and/or sign 1404. For some embodiments, rather than, e.g., AR information being displayed in a textual format, menus may be displayed. For some embodiments, AR information related to a sign is displayed if a user has interacted with a user interface element (such as a menu). For some embodiments, the AR information or user interface item related to a sign is displayed if a user has gazed at the sign for, e.g., more than a first threshold but less than a second threshold. For some embodiments, AR information related to a sign may be displayed on a heads-up display at a fixed displacement from a background object. For some embodiment, AR information related to a sign may be displayed at a fixed displacement from a background object if the sign has disappeared from view of the heads-up display.

Exemplary Applications

In some embodiments, determining persistence values may include determining how long each object may persist within a user's view, or determining an object's velocity and an object's visibility. Determining an object's velocity may include performing motion tracking of the object. Determining persistence values may include determining how long an object will persist in a user's view based on the object's coordinates, the object's velocity, and boundaries of the received scene information. In some embodiments, determining persistence values may use a straight line of motion model, or using historical motion to predict future motion. Persistence values may be determined up to threshold prediction time limit, which in some embodiments may be 30 seconds. In some embodiments, determining persistence values may include predicting points in a line of motion of an object and/or displaying the predicted points in the line of motion of the object. Visibility may be determined for the predicted points in the line of motion of the object, as part of determining persistence values. In some embodiments, determining persistence values may include determining occlusion of an object. In some embodiments, determining persistence for objects in the plurality of AR pairs may include sending the plurality of AR pairs to a persistence determiner; and receiving the determined persistence for objects in the plurality of AR pairs.

In some embodiments, prioritizing display of AR information may include presenting AR information first for objects having a predicted persistence shorter than a first threshold. In some embodiments, prioritizing display of AR information may include presenting AR information first for objects having a predicted persistence shorter than a first threshold but longer than a second threshold. Prioritizing display of AR information may include determining whether AR information for an object has been displayed; and responsive to determining that AR information for the object has been displayed, not displaying the AR information for the object again. Prioritizing display of AR information may include assigning a prioritization score to an AR pair; and displaying AR information corresponding to pairs having higher prioritization scores prior to displaying AR information corresponding to pairs having lower prioritization scores. Prioritizing display of AR information may include highlighting a display of the AR information with a different font size or color than AR information that is not prioritized. Some embodiments of the method may further include: responsive to receiving the scene information, sending the scene information to an information service, and wherein receiving a plurality of AR pairs includes receiving the plurality of AR pairs from the information service. Receiving scene information may include sensing scene information with a scene sensor. And in some embodiments, scene information may include a point cloud.

In some embodiments, a method of prioritizing AR information based on object persistence within a user's view may include tracking motion of a plurality of real-world objects; based on the tracking of the objects, predicting how long each object is likely to persist in the user's field of view; and prioritizing display of the AR information for those objects having shorter predicted persistence, wherein prioritizing display of the AR information comprises displaying first.

In some embodiments, a system may include a processor; and a non-transitory computer-readable medium storing instructions that are operative, when executed by the processor, to perform the methods disclosed herein. A system may further include a display and a scene sensor.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method comprising:
   determining that a user has an ongoing interaction with an object-annotation pair;
   determining that the object of the object-annotation pair has left the field of view of the user;
   determining that the user was not yet finished reading the annotation of the object-annotation pair when the object of the object annotation pair has left the field of view of the user;
   responsive to determining that the object has left the field of view of the user and that the user was not yet finished reading the annotation of the object-annotation pair when the object has left the field of view of the user:
      generating a virtual representation of the object; and
      displaying the virtual representation of the object while continuing to display the annotation associated with the object.
2. The method of claim 1, wherein displaying the virtual representation of the object is based on when the object is predicted to re-emerge within the field of view of the user.

3. The method of claim 1, wherein determining that the user has the ongoing interaction with the object-annotation pair comprises detecting that a gaze of the user is fixated on one of the annotation or the object up to a time the object leaves the field of view of the user.

4. The method of claim 1, further comprising displaying the object after the object re-emerges within the field of view of the user.

5. The method of claim 1, wherein determining that the object has left the field of view of the user comprises determining that the object is hidden from the field of view of the user due to occlusion by a second object.

6. The method of claim 1, wherein determining that the object has left the field of view of the user comprises determining that the object has moved beyond an edge of the field of view of the user.

7. The method of claim 1, wherein determining that the user was not yet finished reading the annotation is based on an amount of time that the annotation was displayed before the object left the field of view of the user.

8. The method of claim 1, wherein determining that the user was not yet finished reading the annotation is based on using eye tracking to determine portions of the annotation likely to have been read by the user.

9. The method of claim 1, wherein determining that the user was not yet finished reading the annotation is based on detecting that the ongoing interaction with the object-annotation pair was interrupted.

10. The method of claim 1, wherein displaying the virtual representation of the object is discontinued at a time when the object re-emerges into the field of view of the user.

11. An apparatus comprising:
a processor; and
a computer-readable medium storing instructions operative, when executed by the processor, to cause the apparatus to:
determine that a user has an ongoing interaction with an object-annotation pair;
determine that the object of the object-annotation pair has left the field of view of the user;
determine that the user was not yet finished reading the annotation of the object-annotation pair when the object of the object annotation pair has left the field of view of the user;
responsive to determining that the object has left the field of view of the user and that the user was not yet finished reading the annotation of the object-annotation pair when the object has left the field of view of the user:
generate a virtual representation of the object; and
display the virtual representation of the object while continuing to display the annotation associated with the object.

12. A method comprising:
determining that a user has an ongoing interaction with a real-world object;
determining that the real-world object has left the field of view of the user;
determining that the user was not yet finished viewing augmented reality (AR) information associated with the real-world object when the real-world object has left the field of view of the user;
responsive to determining that the real-world object has left the field of view of the user and that the user was not yet finished viewing the AR information when the real-world object has left the field of view of the user:
generating a virtual object as a substitute for the real-world object; and
displaying the virtual object as a substitute for the real-world object.

13. The method of claim 12, further comprising:
displaying the augmented reality (AR) information in association with the real-world object,
wherein responsive to determining that the real-world object has left the field of view of the user, displaying the virtual object as the substitute of the real-world object occurs while continuing to display the AR information in association with the virtual object as the substitute of the real-world object.

14. The method of claim 13, wherein displaying the virtual object as the substitute of the real-world object is based on when the real-world object is predicted to re-emerge within the field of view of the user.

15. The method of claim 12, wherein determining that the object has left the field of view of the user comprises determining that the object is hidden from the field of view of the user due to occlusion by a second object.

16. The method of claim 12, wherein determining that the object has left the field of view of the user comprises determining that the object has moved beyond an edge of the field of view of the user.

17. The method of claim 12, wherein determining that the user was not yet finished reading the AR information is based on an amount of time that the AR information was displayed before the object left the field of view of the user.

18. The method of claim 12, wherein determining that the user was not yet finished reading the AR information is based on using eye tracking to determine portions of the AR information likely to have been read by the user.

19. The method of claim 12, wherein determining that the user was not yet finished reading the AR information is based on detecting that the ongoing interaction with the real-world object was interrupted.

20. The method of claim 12, wherein displaying the virtual representation of the object is discontinued at a time when the object re-emerges into the field of view of the user.

21. An apparatus comprising:
a processor; and
a computer-readable medium storing instructions operative, when executed by the processor, to cause the apparatus to:
determine that a user has an ongoing interaction with a real-world object;
determine that the real-world object has left the field of view of the user;
determine that the user was not yet finished viewing augmented reality (AR) information associated with the real-world object when the real-world object has left the field of view of the user;
responsive to determining that the real-world object has left the field of view of the user and that the user was not yet finished viewing the AR information when the real-world object has left the field of view of the user:
generate a virtual object as a substitute for the real-world object; and
display the virtual object as a substitute for the real-world object.

* * * * *